(12) United States Patent
Perkins

(10) Patent No.: US 6,212,959 B1
(45) Date of Patent: Apr. 10, 2001

(54) HYDRATION INSURING SYSTEM COMPRISING LIQUID-FLOW METER

(76) Inventor: Craig R. Perkins, 17 Cala Moreya St., Laguna Niguel, CA (US) 92677

( * ) Notice: Subject to any disclaimer, the term of this patent is extended or adjusted under 35 U.S.C. 154(b) by 0 days.

(21) Appl. No.: 09/366,075

(22) Filed: Aug. 3, 1999

(51) Int. Cl.⁷ .............................. G01F 1/28; G01F 15/00
(52) U.S. Cl. ..................... 73/861.77; 73/861.79; 73/861.74
(58) Field of Search ................ 73/861.74, 861.75, 73/861.78, 861.77, 861.79; 119/14.15, 14.17

(56) References Cited

U.S. PATENT DOCUMENTS

| | | |
|---|---|---|
| 2,167,172 | 7/1939 | Estep ........................ 72/231 |
| 2,842,963 | 7/1958 | Ardley ....................... 73/231 |
| 3,650,473 | 3/1972 | Malone ...................... 239/333 |
| 3,866,469 | 2/1975 | Wemyss ..................... 73/229 |
| 3,867,840 | 2/1975 | Baatz ........................ 73/229 |
| 3,919,455 | 11/1975 | Sigdell et al. .............. 73/226 |
| 4,058,011 | 11/1977 | Martig, Jr. ................. 73/194 |
| 4,095,726 | 6/1978 | Hechler, IV et al. ........ 222/175 |
| 4,100,797 | 7/1978 | Oberhardt et al. .......... 73/194 E |
| 4,194,386 | 3/1980 | Waters ....................... 73/3 |
| 4,253,341 * | 3/1981 | Ikeda et al. ................ 73/861.77 |
| 4,282,883 * | 8/1981 | Yerushalmy ................ 73/861.77 |
| 4,317,178 | 2/1982 | Head .......................... 364/510 |
| 4,350,265 | 9/1982 | Griffiths et al. ............ 222/38 |
| 4,386,716 | 6/1983 | Buck .......................... 222/37 |
| 4,489,600 | 12/1984 | Han ........................... 73/275 |
| 4,489,616 | 12/1984 | Priddy ....................... 73/861.79 |
| 4,515,022 * | 5/1985 | Brand ........................ 73/861.79 |
| 4,526,298 | 7/1985 | Boxer et al. ................ 222/130 |
| 4,538,445 | 9/1985 | Kenik ......................... 73/3 |
| 4,591,978 | 5/1986 | Peterson et al. ............ 364/200 |
| 4,723,437 | 2/1988 | McKenzie ................... 73/3 |
| 5,024,219 * | 6/1991 | Dietz .......................... 128/204.21 |
| 5,341,686 | 8/1994 | Chai ........................... 73/861.33 |
| 5,419,465 | 5/1995 | Schroeder ................... 222/386.5 |
| 5,527,451 | 6/1996 | Hembree et al. ........... 210/88 |

* cited by examiner

*Primary Examiner*—Harshad Patel
(74) *Attorney, Agent, or Firm*—David Pressman; John S. Heyman

(57) ABSTRACT

A system for insuring proper human hydration comprises an oral-suction-activated flow meter (202) which measures and displays (292) the volume of fluid (255) withdrawn from a reservoir (258) through tubing (270). An optional check valve (280) prevents return flow of fluid (255) from the user's mouth (205) to the reservoir (258). Mode and control buttons (294) control operation of a microprocessor (300) and a display (292). Both alphanumeric (292) and graphical (730, 850) displays show the volume withdrawn as a function of time or other events. Drink reminder alarms are provided through a display (292) or loudspeaker (520) to alert the user when it is time for a drink to ensure proper hydration.

19 Claims, 13 Drawing Sheets

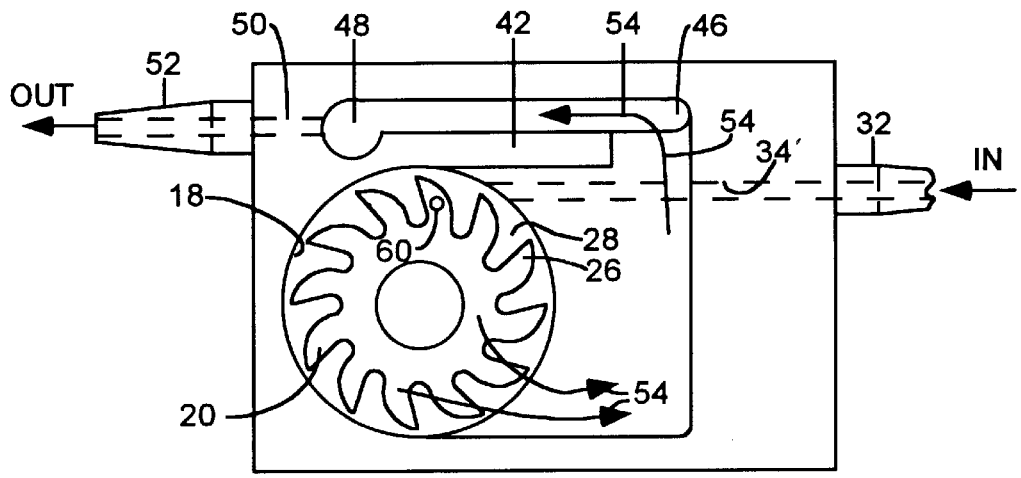
Fig. 1—Prior-Art
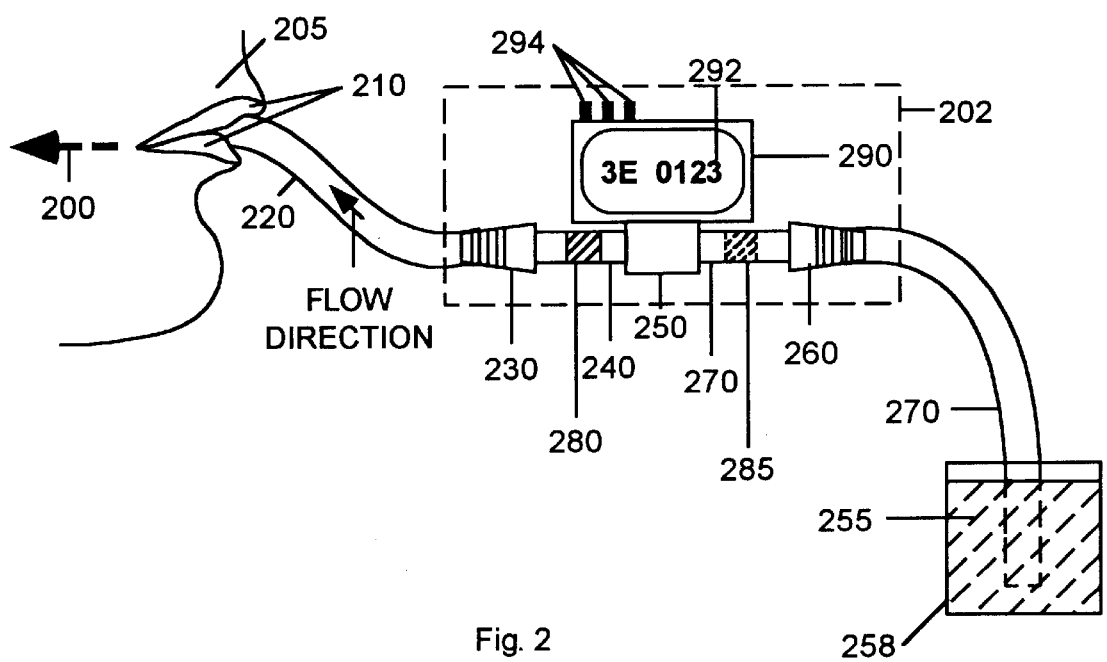
Fig. 2

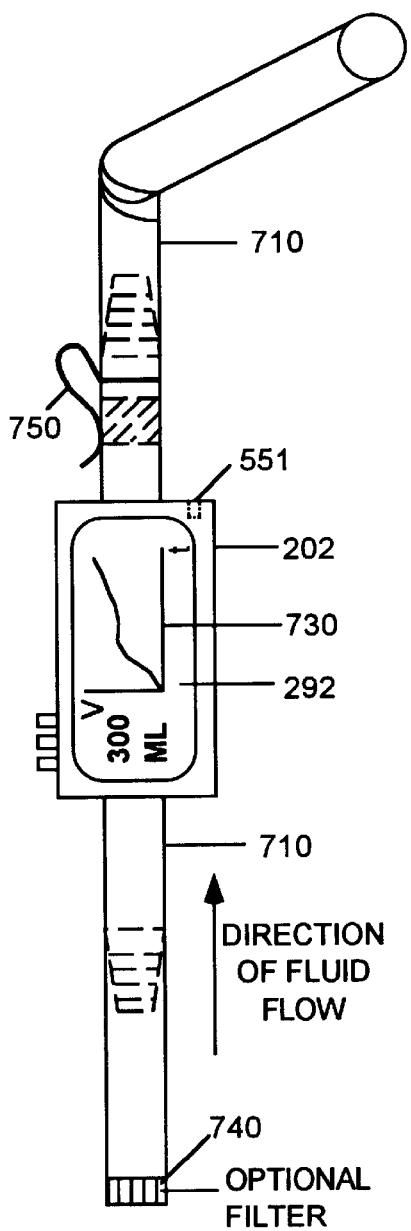
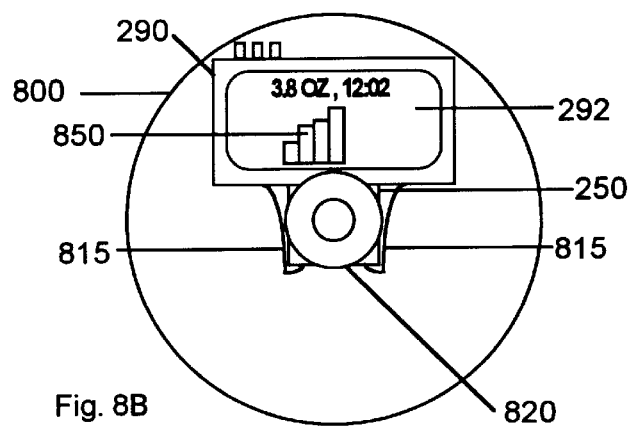
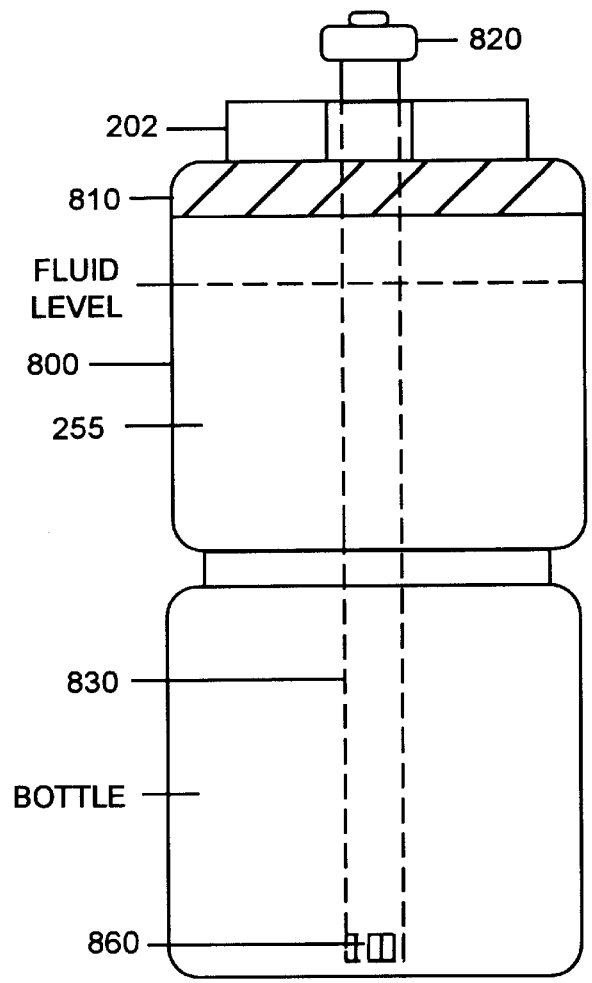
Fig. 7
Fig. 8B
Fig. 8A

HYDRATION INSURING SYSTEM COMPRISING LIQUID-FLOW METER

BACKGROUND

1. Field of Invention

This invention relates to the measurement of liquid flow, particularly to metering fluid intake for proper human hydration.

2. Prior-Art—Hydration Systems

Physicians generally agree that for optimum health and proper nutrition, each person should drink at least eight 240 ml (8-oz) glasses of water a day under normal conditions. This is because fluids are continually lost from the body at varying rates throughout the day, the rate of loss increasing during exertion. Serious consequences result if this water is not replaced in the proper amount and at the proper time. These consequences include fatigue, nausea, loss of consciousness, and, potentially, death. This problem is compounded because thirst is not a reliable indicator of the need for hydration (water); one can be in severe need of hydration, yet not feel thirsty.

In all athletic endeavors, it is vital to maintain a proper level of hydration in one's body. It is well-known that proper body hydration is essential before, during, and after strenuous exercise. See, for example, "Exercise and Fluid Replacement", V. A. Convertino, et al., Medicine and Science in Sports and Exercise, Vol. 28, No. 1, pages i–vii, 1996. While ad libitum fluid ingestion is useful, and even required, it does not generally provide sufficient hydration.

A survey of 3,003 Americans, released on May 11, 1998 by the Nutrition Information Center at The New York Hospital-Cornell Medical Center and the International Bottled Water Association, found that most Americans are probably only getting about a third of the valuable hydration benefits they need." says Barbara Levin, R. D., Ph.D., director of the Center. "The vast majority aren't drinking enough water to begin with, and, to make matters worse, many don't realize that beverages containing alcohol and caffeine actually rob the body of water."

In hospitals it is frequently vital to maintain the rate of hydration of a patient. In some cases the rate of hydration is partially known by the rate of delivery of intravenously supplied fluids. According to the study, "Intravenous vs. Oral Rehydration: Effects on Subsequent Exercise-Heat Stress", J. Appl. Physiol. 82(3): 799–806, 1997, research suggests that after exercise-induced dehydration, intravenous and oral deliveries were equally effective as rehydration treatments. However, intravenous delivery of fluids is invasive and subject to complications. Intravenous delivery is also not a practical means for preventative hydration. In the past, the patient's total oral consumption of fluid has been monitored and maintained by guesswork. Patient care is often deficient, however, because there is no accurate measure of the patient's rate or quantity of hydration. This results in patient upsets and increases time and effort required by the medical staff.

According to the March, 1994 issue of the Canadian Medical Journal, studies have shown that an increase in water intake can actually reduce fat deposits. Drinking enough water is the best treatment for water retention. Since water is the key to fat metabolism, it follows that the overweight person needs to drink more water. Although, as stated, on the average, a person should drink eight eight-ounce glasses every day, the overweight person needs one additional glass for every 25 pounds of excess weight.

According to the Journal of the American Dietetic Association, Vol. 99, No. 2, February, 1999, in the article titled: "Water: An Essential but Overlooked Nutrient", "New research indicates that fluid consumption in general and water consumption in particular can have an effect on the risk of urinary stone disease; cancers of the breast, colon, and urinary tract; childhood and adolescent obesity; mitral valve prolapse; salivary gland function; and overall health in the elderly. Dietitians should be encouraged to promote and monitor fluid and water intake among all of their clients and patients through education and to help them design a fluid intake plan."

Various liquid containers for supplying drinking water are commercially available. They range from a simple bottle to a sports-oriented backpack reservoir with a delivery tube. Several models of a backpack reservoir system are sold by FasTrak Systems, Inc., P O Box 1029, Weatherford, Tex. 76086-1029, under the mark CamelBak. The HydroBak™ model comprises an insulated fluid reservoir which holds 1.5 liters (50 oz). After filling, the reservoir is placed in a sack-like container. A pair of straps holds the sack against the user's back. In an alternative design, the reservoir is strapped to a waist-pack on the user's waist in a similar fashion. A flexible tube, of length approximately 38 cm (15 in), and diameter of approximately 0.95 cm (⅜ in) connects to the reservoir. A valve-mouthpiece is secured to the distal end of the tube. Some prior-art valves are opened by a biting action; others are opened by forcing the valve open with the user's mouth parts. To obtain water (or another fluid) from the reservoir, the user simply opens the valve and creates a suction with her or his mouth. In response to this suction, fluid leaves the reservoir and is delivered to the user's mouth for swallowing. This system provides ad-libitum hydration only. It does not accurately indicate the volume of fluid consumed, or the rate at which the fluid has been consumed. Nor does it provide a reminder for users who may be dehydrated but not thirsty.

A similar sport hydration system is taught by Boxer et al. in U.S. Pat. No. 4,526,298 (1985). In this system, the user wears a back-mounted, liquid-filled reservoir. A flexible tube, similar to the above, connects the reservoir to a hand-held, hand-operated pump. When the pump handle is squeezed, the pump delivers either a stream or a spray of water, depending upon the adjustment of a nozzle attached to the pump's output orifice. The user can thus spray a stream of liquid into her or his mouth to be swallowed, or optionally douse her or his face or other body areas with a cooling mist.

Operation of Boxer's pump handle requires the user to have one band free. This is not always possible when the user is riding a bicycle, climbing a mountain, or skiing. More importantly, although the spray produces a feeling of comfort, it does not contribute to the user's level of hydration. Further, Boxer's system does not measure the volume of fluid delivered over a predetermined period of time. While dousing one's body with a cooling mist may feel good, it does nothing to maintain proper hydration.

A liquid dispenser meter is taught by Griffiths et al., in U.S. Pat. No. 4,350,265 (1982). This meter is mounted on a bottle which contains an alcoholic beverage. To dispense the alcohol, the bottle is inverted, causing the alcohol to fill a measuring chamber. Pressing on a plunger causes (a) a predetermined volume of liquid in the chamber to be dispensed, and (b) a counter to be advanced by one count. Thus by knowing the volume dispensed each time the plunger is pushed, and the volume of liquid in the measuring chamber, the total volume of liquid dispensed through the meter is known. While it provides information about liquid volume dispensed, this system does not display the volume dispensed as a function of time. Further, the bottle must be inverted in order to dispense liquid, the flow being urged by gravity. A user such as a bicyclist would not use this system because it dispenses an alcoholic beverage, which, as stated, actually decreases hydration. Also the bicyclist cannot conveniently get water from the inverted bottle and cannot use oral suction to dispense liquid from the bottle. The rate of consumption is not indicated and there is nothing to remind the user to drink. Thus, even if this system could be used by inverting the bottle, Griffiths' system provides only ad-libitum consumption of liquids and cannot ensure that the user maintains proper hydration.

Sigdell et al., in U.S. Pat. No. 3,919,455 (1975) teach an apparatus which measures the volume and flow rate of liquids. This system uses a siphon-suction principle in which a container is filled by suction, then when a predetermined level is reached, a siphon causes the container to drain. Electrical sensors detect the evacuation of the container and signal that the container is ready for another fill-and-drain cycle. While this system provides information about liquid volume dispensed, it does not display the volume dispensed as a function of time. Further, suction is used only to fill the chamber. If the siphon action is not allowed, the chamber will not drain and the chamber will remain full. Even if repeated siphon and suction cycles were employed, this system would not be practical in human hydration applications. The entire contents of the container are drained in each siphon cycle. Thus, the user would be required to swallow the entire volume of the container. Because of the container's fixed size, it would not be possible for the user to withdraw a single sip of liquid at one time, and at a later time withdraw a mouth-full from the same container. Because of these limitations, this system is not applicable to maintenance of hydration.

None of the prior-art fluid supply systems accurately reports the rate of fluid consumption. Further, none of the prior-art fluid supply systems indicates, in advance of the user's thirst, that it is time to consume more fluid. By the time a user is thirsty, she or he is already partially dehydrated.

3. Prior-Art—Flow Meters

Many prior-art liquid flow meters are known. In general, they comprise the following types: differential pressure, positive displacement, velocity, and mass meters. In differential pressure meters, flow is inferred from the pressure differential which arises from flow in a predetermined geometry. These include orifice, Pitot, venturi, and other well-known types. In positive displacement meters, flow is related to the movement of a member within the meter. These include rotary vane, gear, and piston types, among others. Velocity types measure the velocity of the liquid through a region of known cross-section. These include turbine, sonic, and ultrasonic types, among others. Mass flow types measure the actual passage of mass through the meter. These include thermal, optical, coriolis, and other types.

U.S. Pat. No. 4,489,616 (1984) to Priddy teaches a "Digital Fluid Flow Meter". In this meter, fluid impinges on the vanes of a rotary impeller, forcing it to turn. FIG. 1 shows the principal elements of this meter. Liquid enters the meter through external connection 32. It flows through channel 34 and exits into the chamber bounded by circular opening 18. The fluid flow impinges on radial vanes 26 of impeller assembly 20, which is free to rotate on bearings (not shown). Fluid fills the spaces 28 between vanes 26. Fluid leaves the region surrounding the impeller through an outflow channel (not shown) along flow lines 54. The fluid finally exits the flow meter through orifice 50 and exit fitting 52. The rate of rotation of impeller 20 is proportional to the rate of flow of the fluid passing through the meter. The driving force for fluid motion is generally derived from elevated pressure applied to the fluid entering at connection 32.

A magnet 60 is secured in one of the vanes 26 of impeller 20. An external coil is placed in the vicinity of the impeller. As the impeller turns, the motion of the magnet induces a voltage in the coil. This voltage creates a current generally in the form of transient pulses which have a rising edge as the magnet approaches the coil, and a falling edge as the magnet retreats. These pulses are counted using conventional digital electronic circuitry. The pulse rate frequency is equal to the rate of rotation of impeller 20, and thus is directly proportional to the rate of flow of liquid through the meter assembly. With appropriately tight tolerances, Priddy's meter can be made to approximate a positive displacement flow meter.

While Priddy can accurately measure flow volume and rate, his system does not solve the aforementioned hydration problems.

OBJECTS AND ADVANTAGES

Accordingly, several objects and advantages of the present invention are to provide a method and apparatus to accurately meter and report the rate of consumption of fluids. A further object is to provide a display which indicates to the user when it is time to consume fluid, in advance of the user's thirst craving. Another object is to provide a fluid metering, reporting, and alarming system which is compact, inexpensive, rugged, portable, orally activated, and simple to use and understand. Still another object is to provide a fluid metering system which enhances both normal and athletic performance and protects health, promotes patient compliance, and ensures proper maintenance of body hydration.

Additional objects and advantages will become apparent from a consideration of the drawings and ensuing descriptions thereof.

SUMMARY

In accordance with the present invention, a fluid measurement system and method uses a flow meter to measure volume and volume rate of fluid flow obtained by the user through oral suction. Standard fluid reservoirs and tubing are used in novel combination with a flow meter which maintains a record of fluid that the user has drawn into the mouth. The flow meter optionally provides auditory, visual, or tactile stimuli to signal the user to sip fluids at predetermined or calculated times. Through proper management of fluid dispensation, the user experiences increased athletic performance, and improved maintenance of health.

BRIEF DESCRIPTION OF THE DRAWINGS

FIG. 1 is a cross-sectional view of a prior-art flow meter.

FIG. 2 shows the preferred embodiment of a flow meter hydration system according to the present invention.

FIG. 7 shows the preferred embodiment inserted in line with a drinking straw.

FIGS. 8A and 8B show the preferred embodiment incorporated with a drinking bottle.

DRAWING FIGURE REFERENCE NUMERALS

Figure 3:
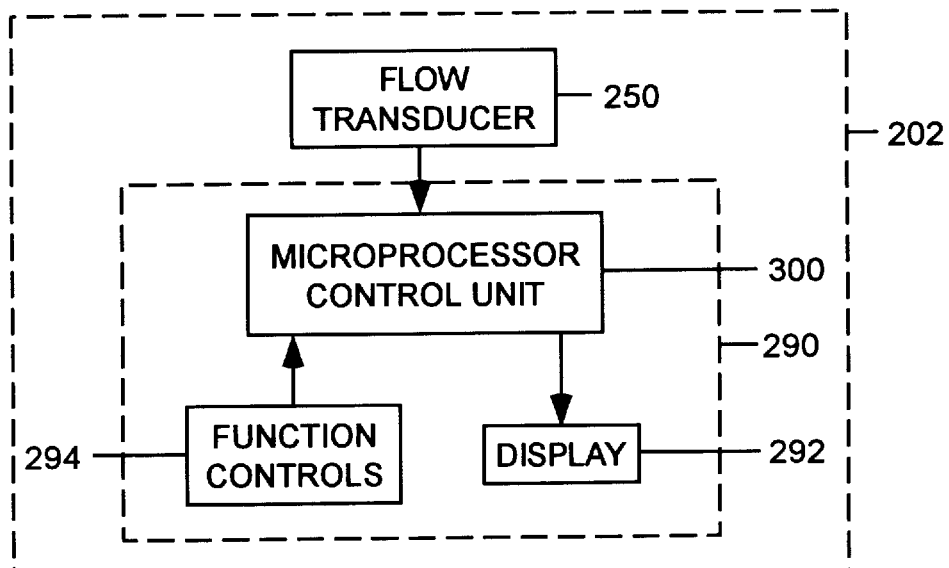
FIG. 3 is a block diagram showing the principal components of a preferred embodiment of the system.
Figures 4A, 4B:
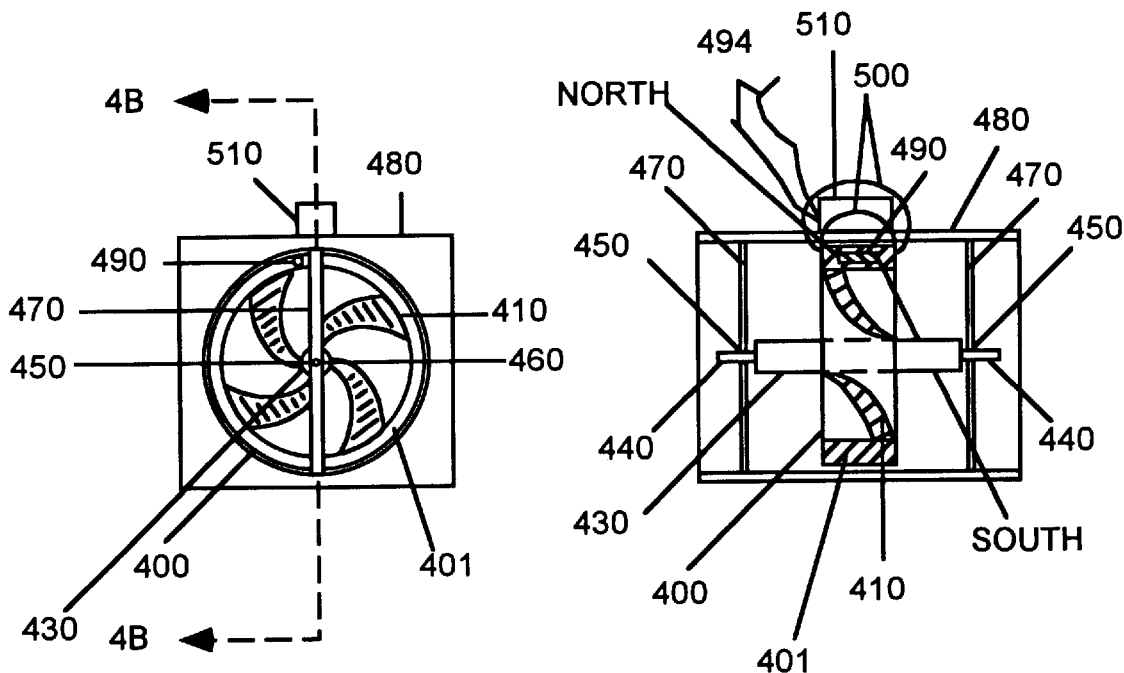
FIGS. 4A and 4B are two views of the flow sensor component of the preferred embodiment.
Figure 5:
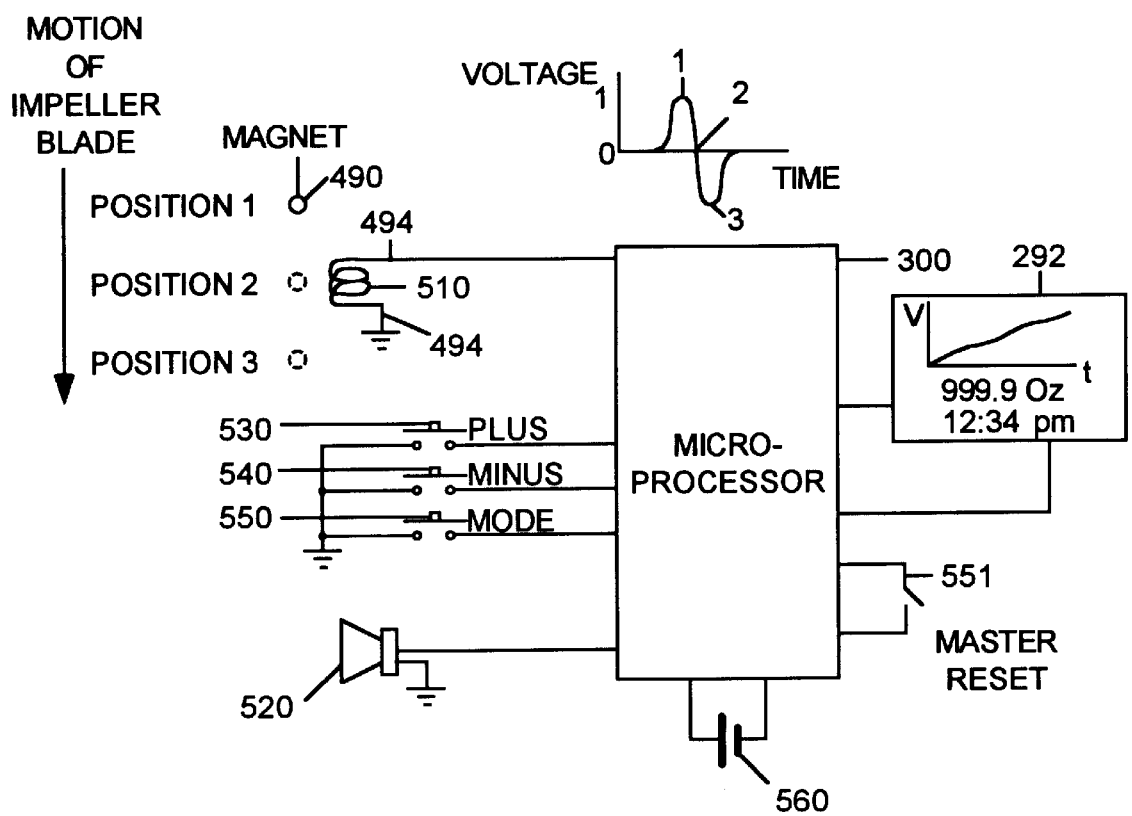
FIG. 5 is an electronic schematic diagram of the preferred embodiment.
Figure 9:
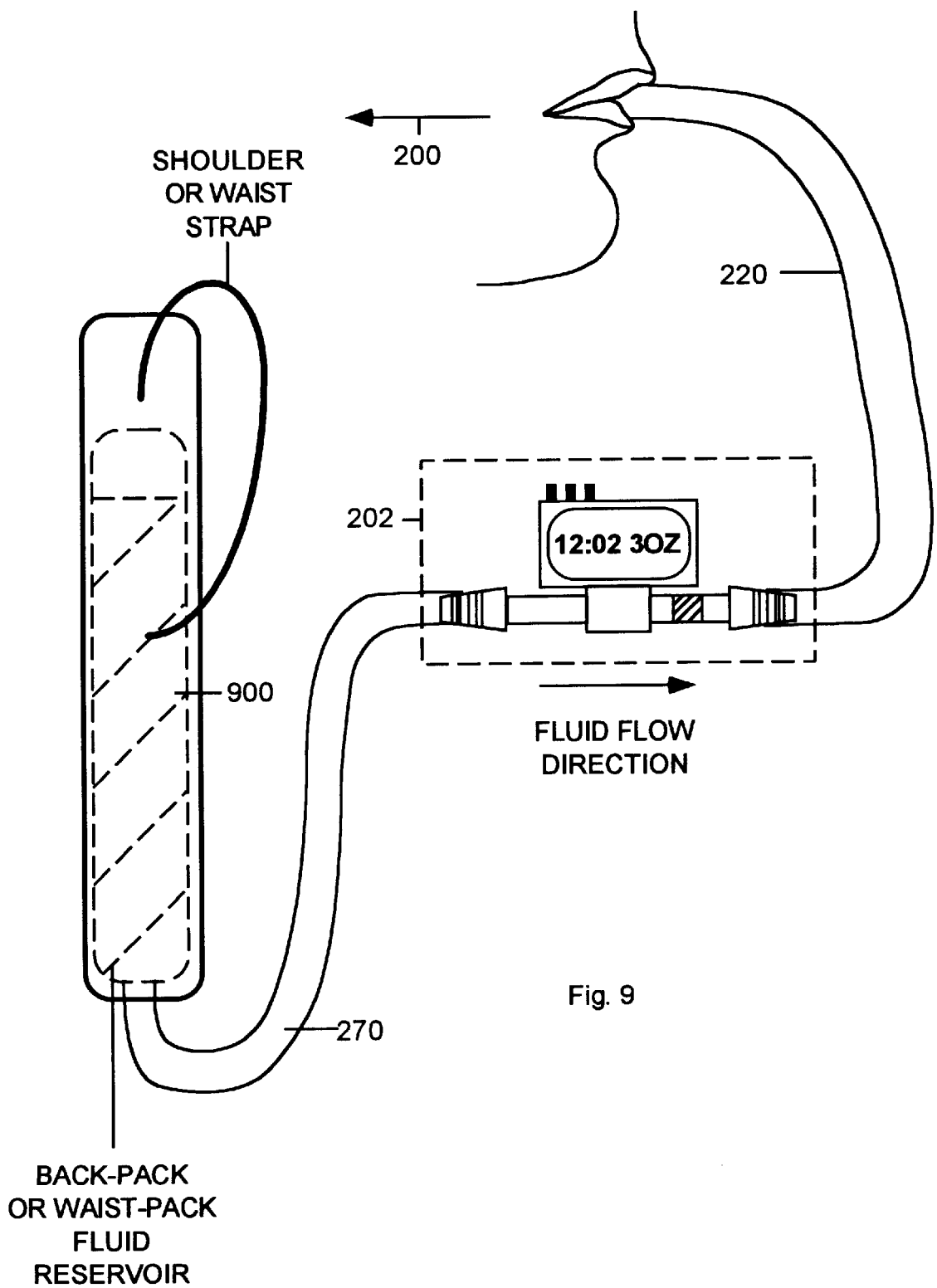
FIG. 9 shows the preferred embodiment in use with a backpack or waist-pack reservoir.
Figure 10:
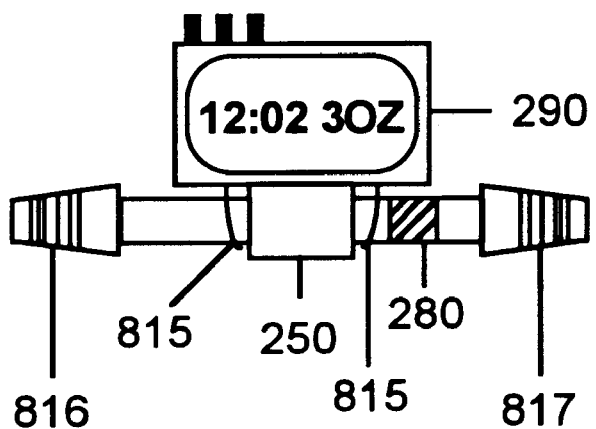
FIG. 10 shows the preferred embodiment with the flow sensor attached to the electronics section.
Figure 11:
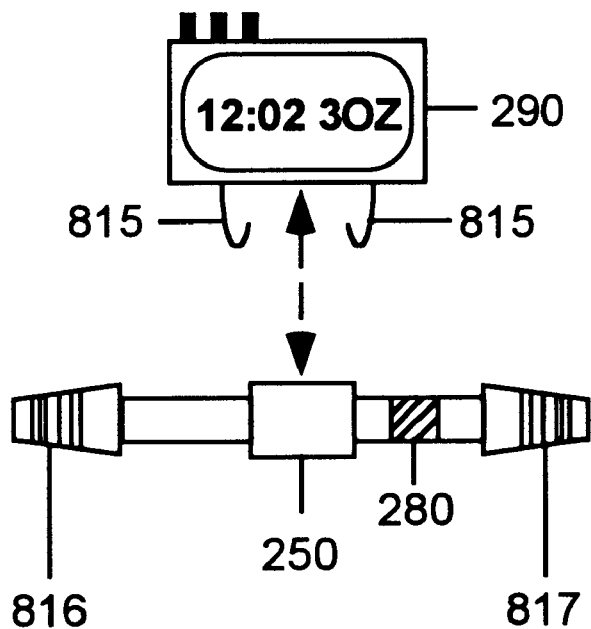
FIG. 11 shows the preferred embodiment with the flow sensor detached from the electronics section.

FIG. 1—Prior-art
18 Circular opening
20 Impeller
26 Radial vanes
28 Spaces
32 External connection
50 Orifice
52 Exit fitting
54 Flow lines
60 Magnet
FIG. 2
200 Oral suction
202 Flow meter and indicator
205 User
210 Lips
220 Tubing
230 Fitting
240 Exit tube
250 Flow metering device or transducer
255 Fluid
258 Reservoir
260 Fitting
270 Entrance tube
280 Check-valve
285 Alternative check-valve position
290 Display and Control Unit
292 Display
294 Control buttons
FIG. 3
202 Preferred embodiment
250 Flow transducer
290 Display and Control Unit
292 Display
294 Function controls
300 Microprocessor control unit
FIGS. 4A and 4B
400 Impeller assembly
401 Ring
410 Angled vanes
430 Shaft
440 Journals
450 Bearings
460 Holes
470 Bearing mounts
480 Housing
490 Magnet
494 Wires
500 Magnetic field lines
510 Coil
FIG. 5
292 Display
300 Microprocessor
490 Magnet
494 Wires
510 Sensor
520 Loudspeaker
530 Switch
540 Switch
550 Switch
551 Switch
560 Power source
FIGS. 6A through 6G
600–1648 Blocks
FIG. 7
202 Flow meter assembly
250 Electronics
292 Display
551 Recessed switch
710 Drinking straw
730 Graph
740 Filter
750 Clip
FIGS. 8A and 8B
202 Flow meter assembly
250 Flow transducer
290 Display and control unit
255 Liquid
800 Bottle
810 Lid
815 Clips
820 Cap
830 Optional tube
850 Bar graph
860 Filter
FIG. 9
200 Suction
202 Flow meter
220 Tubing
270 Tubing
900 Reservoir
FIGS. 10 and 11
250 Flow transducer
280 Optional check valve
290 Display
815 Clips
816 Connector
817 Connector
FIGS. 12A through 12D
1205 Consumption rate goal line
1215 Fluid consumption vs. time
1218 Volume goal line
1230 Volume remaining vs. time
1240 Bar chart
1250 Fluid consumed
1245 Fluid remaining
1260 Pie chart
1270 Fluid consumed
1265 Fluid remaining

PREFERRED EMBODIMENT—FIG. 2—
Description

FIG. 2 is a block diagram showing the various components of a flow meter hydration system of the present invention, in use by a user 205. The main components or elements of FIG. 2 are a suction-activated flow meter and indicator 202, a water or liquid reservoir 258, and tubings 220 and 270 to connect the reservoir to the meter and the meter to the user.

Specially, suction indicated by arrow 200, is provided within the mouth of user 205. The user's lips 210 form a tight seal around tubing 220 which is attached to hollow barbed fitting 230. Although a barbed fitting is shown, fitting 230 can be a friction-fit fitting, a glued junction, or other suitable attachment method. Fitting 230 communicates with exit tube 240 of meter and indicator 202.

In meter and indicator 202 is a flow metering device or "transducer" 250. Device 250 may be similar to that of Priddy, described above and shown in FIG. 1, or it may be of the type described in more detail below. In any case, a positive-displacement-type flow metering device is desirable.

Fluid 255 from external reservoir 258, which is a container such as a bottle or bladder, enters hollow barbed fitting 260 at the input of meter and indicator 202 and flows to metering device 250 through entrance tube 270. From there, it flows through exit tube 240, barbed fitting 230, and tubing 220 to the user's mouth.

An optional, one-way check valve 280 is shown in exit tube 240. Valve 280 permits the flow of fluids in one direction only, in this case from right-to-left. This action prevents return flow of the fluid into the container. Such reverse flow can result in an incorrect volume reading if it is not taken into account. Reverse flow will result in reverse rotation of impeller assembly 400 (FIG. 4). If check valve 280 is not used, a means for detecting and counting reverse rotation, well-known to those skilled in the art of fluid flow measurement, may be used. The reverse fluid volume can be subtracted from the total measured volume.

Valve 280 also helps prevent contaminants in the user's mouth from entering the flow metering device 250 or fluid reservoir 258. An alternative check valve position is shown at 285.

Display and control unit 290 contains means for detecting and analyzing the flow of fluid 255 through metering device 250. Display 292 provides alphanumeric indications of flow rates, time, alarms, and the like. It can also provide graphical indications such as fluid consumed vs. time, and the like. Control buttons 294 enable setting of the internal operating parameters of unit 290. Unit 290 can optionally emit visible, audible, or tactile signals which can be perceived by the user. This is discussed in greater detail below.

The preferred embodiment of meter and indicator 202 can be very compact. A realistic size is 4 cm wide, 2 cm high, and 1 cm deep.

Block Diagram—FIG. 3

Meter and indicator assembly 202 is shown in block diagram form in FIG. 3. Display and control unit 290 preferably comprises a microprocessor control unit 300, one or more function controls 294, and display 292. The output of flow transducer 250 is connected to microprocessor control unit 300. The entire system is typically powered by a known battery or other power source (not shown).

Microprocessor 300 may be of the type PIC15C924PLCC, manufactured by Microchip Corporation, 2355 W. Chandler Blvd, Chandler, Ariz. 85224 USA. Display 292 generally comprises an alphanumeric display of the type LCD-4312, manufactured by Lumex, Inc., 290 E Helen Rd., Palatine, Ill. 60067 USA. It may also comprise an audio transducer of the type EFB-AA14D001, manufactured by Matsushita Electric Corporation of Japan under the mark Panasonic-ECG, or a tactile stimulator such as those manufactured by Telesensory Corporation, 520 Almanor Ave., Sunnyvale, Calif. 94086 USA.

Flow Sensor—FIG. 4

Flow metering device 250 (FIG. 2) comprises an impeller assembly or turbine 400 (FIG. 4A) with four angled vanes or blades 410 terminating in a supporting ring 401. Ring 401 is a solid annulus and is attached to the outer ends of vanes 410 so that it rotates with the vanes. It has a thickness (radial) of about 1 mm and a length (from left to right in FIG. 4B) of about 0.5 cm. A magnet 490 is mounted in a hole in ring 401, parallel to the axis of shaft 430 with north and south poles at the distal ends, as indicated in FIG. 4B. A coil 510 is mounted on the outside of housing 480. The axis of coil 510 is also parallel to the axis of shaft 430. The orientation of magnet 490 can be reversed, if desired, with the only effect being a reversal of the polarity of the pulse created in coil 510, i.e., negative-then-positive vs. positive-then-negative. Either polarity can be counted by microprocessor 300 (FIG. 3). Magnet 490 is typically a cylindrical bar magnet, with diameter and length of 0.5 mm and 1.5 mm, respectively. If necessary, magnet 490 can be counterbalanced by a second magnet, or a non-magnetic weight located in a hole at the opposite side of ring 401. Coil 510 is located in display and control unit 290 (FIG. 2). Wires 494 connect coil 510 to microprocessor 300 (FIG. 5). Impeller assembly 400 (FIG. 4) is mounted on a shaft 430. Journals 440 at the ends of shaft 430 insert into simple bearings 450. Bearings 450 comprise holes 460 in bearing mounts 470, which are secured to housing 480. The diameter of holes 460 is only slightly larger than that of journals 440. Thus impeller assembly 400 is free to rotate within housing 480 while otherwise positionally constrained by holes 460 in mounts 470. The diameter of impeller assembly 400 is preferably about one centimeter (0.5 in). Other components shown in FIGS. 4A and 4B are roughly to scale with respect to one-another. The diameter of journals 440 is typically 0.75 mm (0.03 in), and the axial length of impeller assembly is approximately 0.5 cm (0.25 in). Housing 480 is preferably made of a durable plastic such as polycarbonate. Alternatively, it can be made of a non-metallic metal such as aluminum. Ring 401 and vanes 410 are preferably made of polycarbonate or polyester or another rigid plastic material. Shaft 430 and bearing mounts 470 are preferably made of stainless steel, although in some applications a rigid plastic material such as polycarbonate or polyester may be used.

Flow Meter Assembly Circuit Diagram—FIG. 5

A schematic circuit diagram of one preferred embodiment is shown in FIG. 5. The proximity of magnet 490 is detected as it moves past coil 510 (FIG. 4). At position 1, the coil output voltage is a positive-going peak as the magnet approaches the coil. At position 2, the sensor output voltage is zero when the magnet is at the middle of the coil. At position 3, the sensor output voltage is a negative-going peak when the magnet leaves the coil. When a single magnet 490 is used, each zero-positive-negative-zero transition, or pulse, is counted by microprocessor 300 as one rotation of impeller assembly 400. If a second magnet is used, each pulse is counted as one-half rotation of impeller assembly 400.

During a typical suction-induced flow of fluid through flow sensor 250 (FIG. 2), impeller assembly 400 rotates at a rate of 10 revolutions per second (RPS). Since one magnet is used in this embodiment, the frequency of the output voltage pulses of coil 510 is 10 Hz. More suction increases this frequency; less decreases it. The volume consumed is proportional to the number of pulses. Thus the total volume consumed is determined by counting the number of pulses and storing this count in the memory of microprocessor 300. The rate of consumption is determined by dividing the volume consumed by a convenient time period, preferably one hour, although another time period can be used. An algorithm (formula) which determines the volume and rate of consumption is described below in connection with FIG. 6G.

If desired, the volume consumed in each sip can be measured using another algorithm which counts groups of pulses which are separated by periods of no pulse activity. The volume of each sip is thus proportional to the number of pulses in the group representative of that sip.

Loudspeaker or another type of audio transducer, e.g., a piezoelectric disc, 520 is driven by microprocessor 300 and is used to alert the user to various alarm conditions, such as low reservoir, drink reminder, and time alarm.

Switches 530, 540, and 550 are used to set various internal parameters and to select among various modes of operation. For example, pressing mode switch 550 grounds the mode terminal of microprocessor 300, which causes microprocessor 300 to enter various modes of operation which are programmed into its memory. The various modes are described below in connection with FIG. 6B.

The system can reset individual functions through use of mode switch 550. An additional reset switch can be located in an accessible but less prominent area of the device for complete reset of all functions, including the real time clock.

Momentary closing of master reset switch 551 resets all functions and initializes all counters contained in microprocessor 300, as described below in connection with (block 603) of FIG. 6A. Switch 551 is typically recessed in the body of electronics assembly 202 (FIG. 7) to prevent accidental actuation. It may be actuated by the tip of a pencil, for example.

Operation of the Preferred Embodiment—FIGS. 4–11

In response to suction 200 (FIG. 2) in mouth of user 205, fluid 255 flows axially through metering device 250. Fluid impinging on angled vanes 410 causes impeller assembly 400 to turn. As impeller assembly 400 turns, magnet 490 mounted near the perimeter of impeller assembly 400 in ring 401 creates a periodically changing magnetic field near the outside surface of housing 480, which is made of a non-magnetic material.

The rate of rotation of impeller assembly 400 is determined by the rate of flow of fluid 255. The number of rotations of impeller assembly 400 is thus proportional to the volume of fluid 255 which flows through it. Careful design of impeller assembly 400, vanes 410, housing 480, journals 440, and bearing mounts 470, in accordance with well-known techniques in the fluid metering art, results in a metering device which is accurate for a wide range of flow rates.

Magnetic field lines 500 (FIG. 4B) from magnet 490 are shown extending outside housing 480. At any given location on housing 480, magnetic field 500 varies in strength as impeller assembly 400 turns and magnet 490 approaches then retreats from that location. These variations are detected by coil 510, located on the outer surface of housing 480. As magnet 490 moves in the vicinity of coil 510, a current is induced in coil 510 in well-known fashion. Wires 494 connect coil 510 to microprocessor 300, as shown in FIG. 5.

In the present embodiment, there is one magnet 490 in ring 401 of impeller assembly 400. Thus with each rotation of impeller assembly 400, sensor 510 will see one rise and one fall in magnetic field strength, as shown by the waveform above microprocessor 300. The output of coil 510 thus experiences one positive-going pulse and one negative-going pulse with each rotation of impeller assembly 400. The resultant waveform is shown in FIG. 5. In lieu of a single magnet, two, three, or four magnets can be mounted in symmetrical positions around ring 401. In lieu of ring 401, vanes 410 can be extended to the position of the outer radius of ring 401. In this case, magnet 490 or multiple magnets can be mounted in or on one or more of vanes 410.

Flow Charts—FIGS. 6A through 6G

These flow charts show the algorithmic steps required to calibrate the monitoring system, select display graph styles, update displays, detect switch closures, detect a sip, and determine the volume swallowed by the user over a given period of time. If the volume consumed in a given time period is not sufficient, an audible alarm is sounded.

Figure 6A:
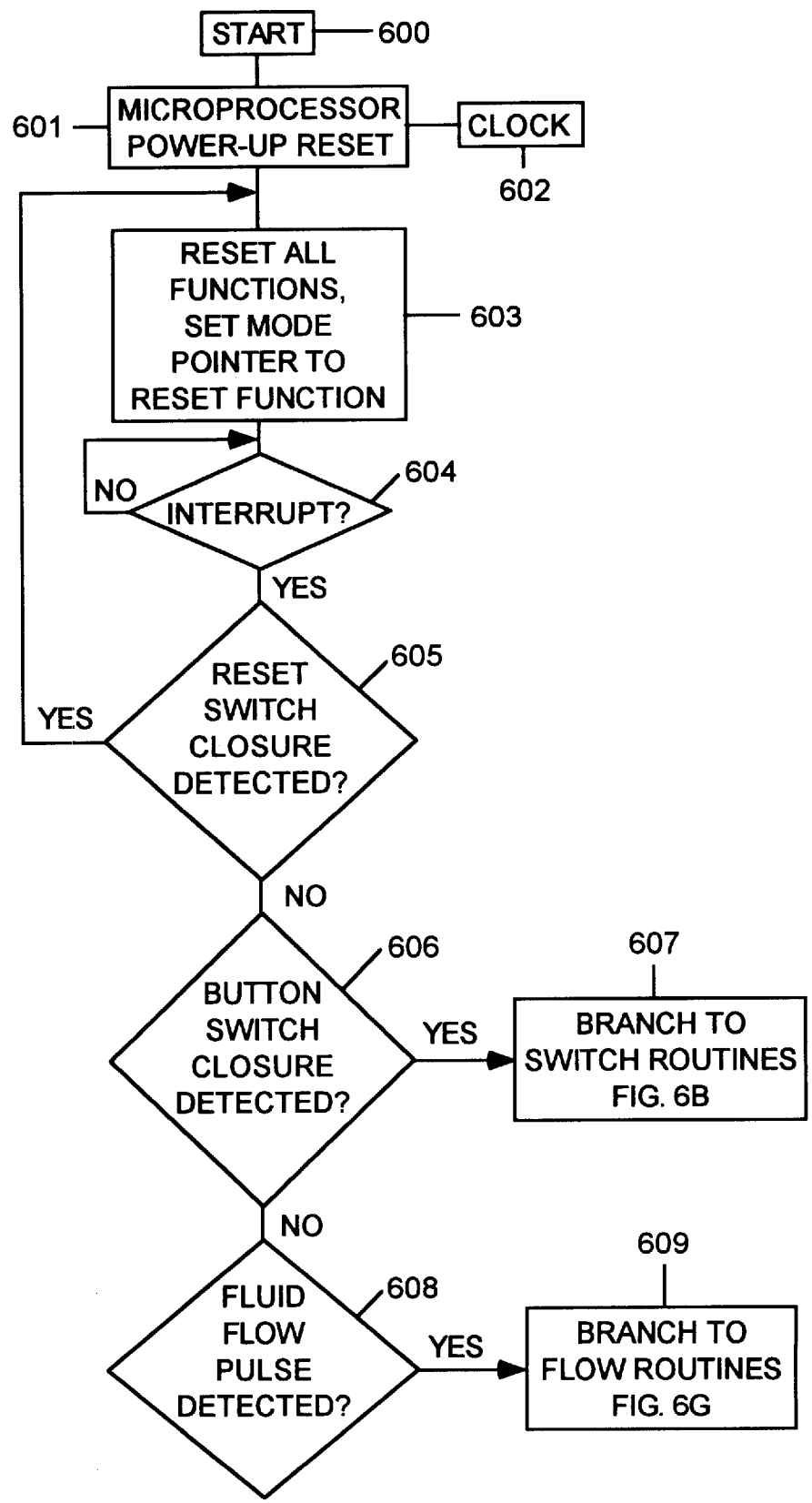
FIGS. 6A through 6G are flow charts showing operation of the preferred embodiment.

FIG. 6A—Reset Functions and Interrupt Handler

The above-mentioned algorithmic steps begin with start block 600 in FIG. 6A. When power is first applied to microprocessor 300 (FIG. 5), a program sequence (not shown) performs a well-known "power-up reset" (block 601). This function resets and initializes all counters and various functions, including a real-time clock (block 602) which is contained in microprocessor 300.

Further programming in block 603, contained in the memory (not shown) of microprocessor 300, resets all the functions and values used in the instant system. After the system is reset, microprocessor 300 waits (block 604) for an "interrupt", well-known in the art of programming.

Switch closures and flow pulses are detected as "interrupts" by the internal circuitry of microprocessor 300. The algorithms which are used to interpret interrupts are referred to as "interrupt handlers". This concept is well-known to those skilled in the arts of computer and microprocessor programming. When a pulse is detected in coil 510 (FIG. 5), or one of switches 530, 540, 550, 551 is closed, microprocessor 300 detects an interrupt.

When an interrupt is detected, microprocessor 300 determines the source of the interrupt. If closure of reset switch 551 is detected (block 605), the interrupt handler program returns program execution to the top of block 603, resetting all user functions and setting a mode "pointer", described below, to its first position, a reset function. Pointers are well-known to those skilled in the art of computer programming. When a pointer is set to a location in a computer program, execution of the program continues from that point.

If a button switch (530, 540, or 550 in FIG. 5) closure is detected (block 606), then the algorithm branches to the switch routines in FIGS. 6B through 6F (block 607).

Figure 6B:
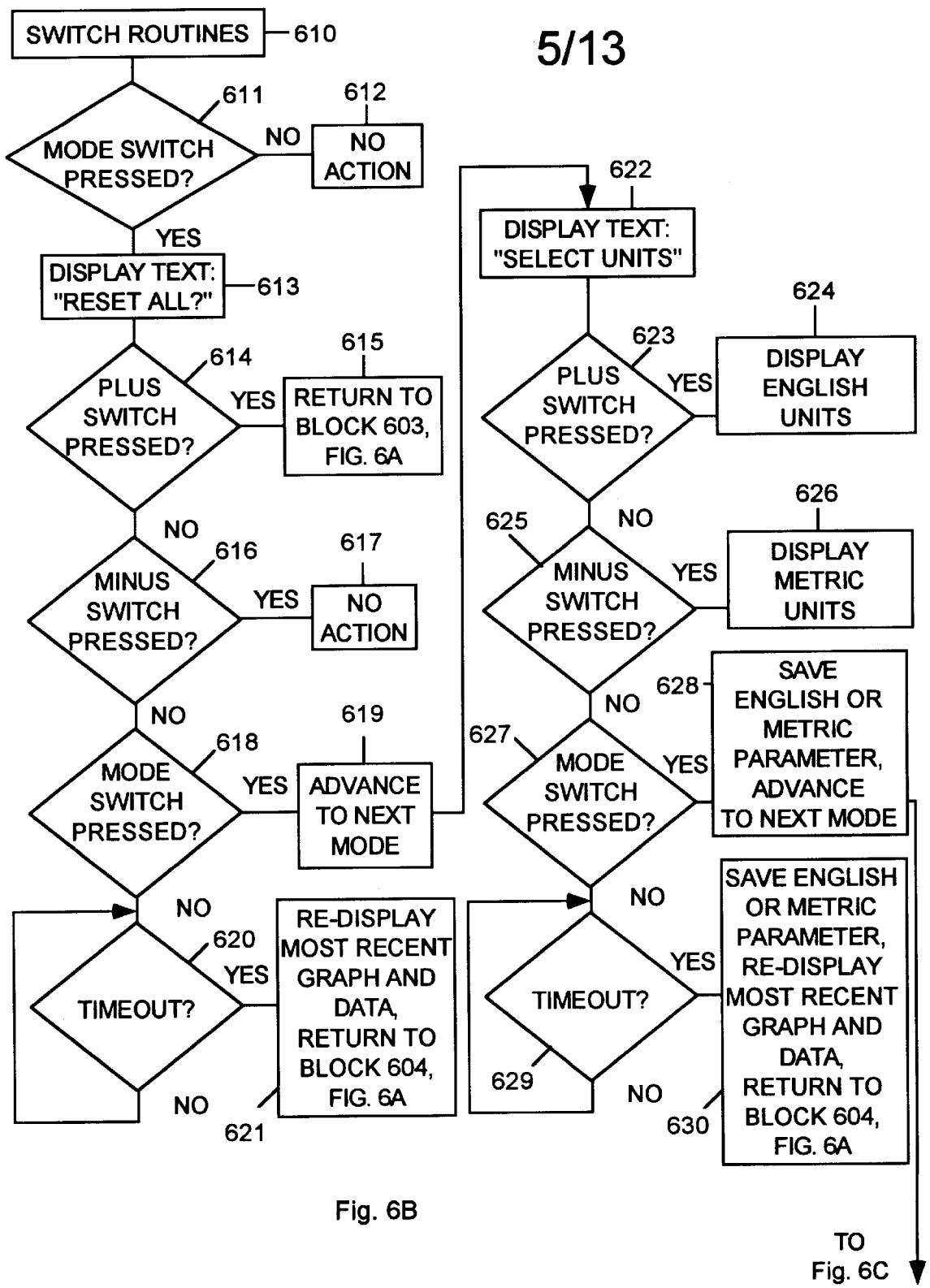
Figure 6C:
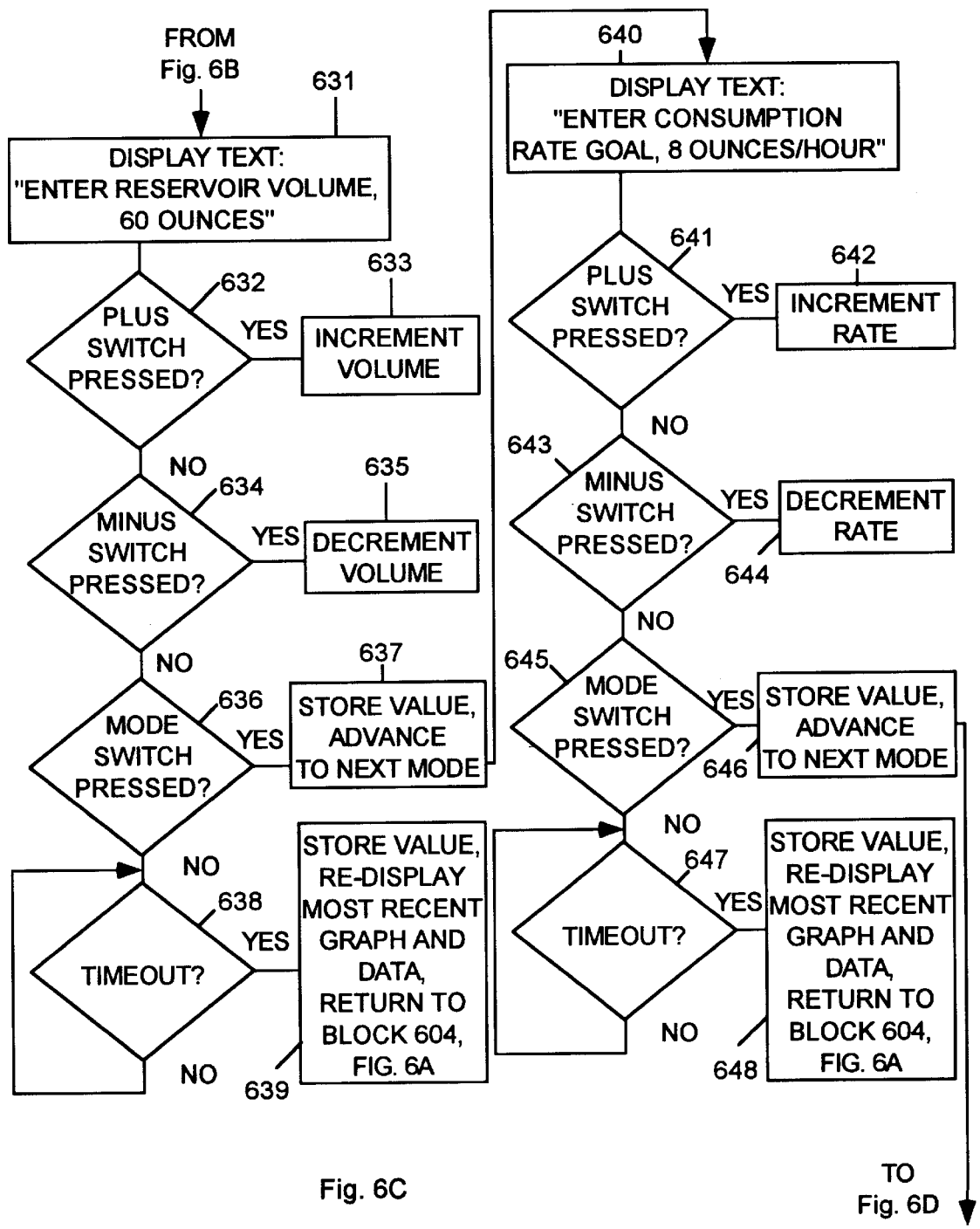
Figure 6D:
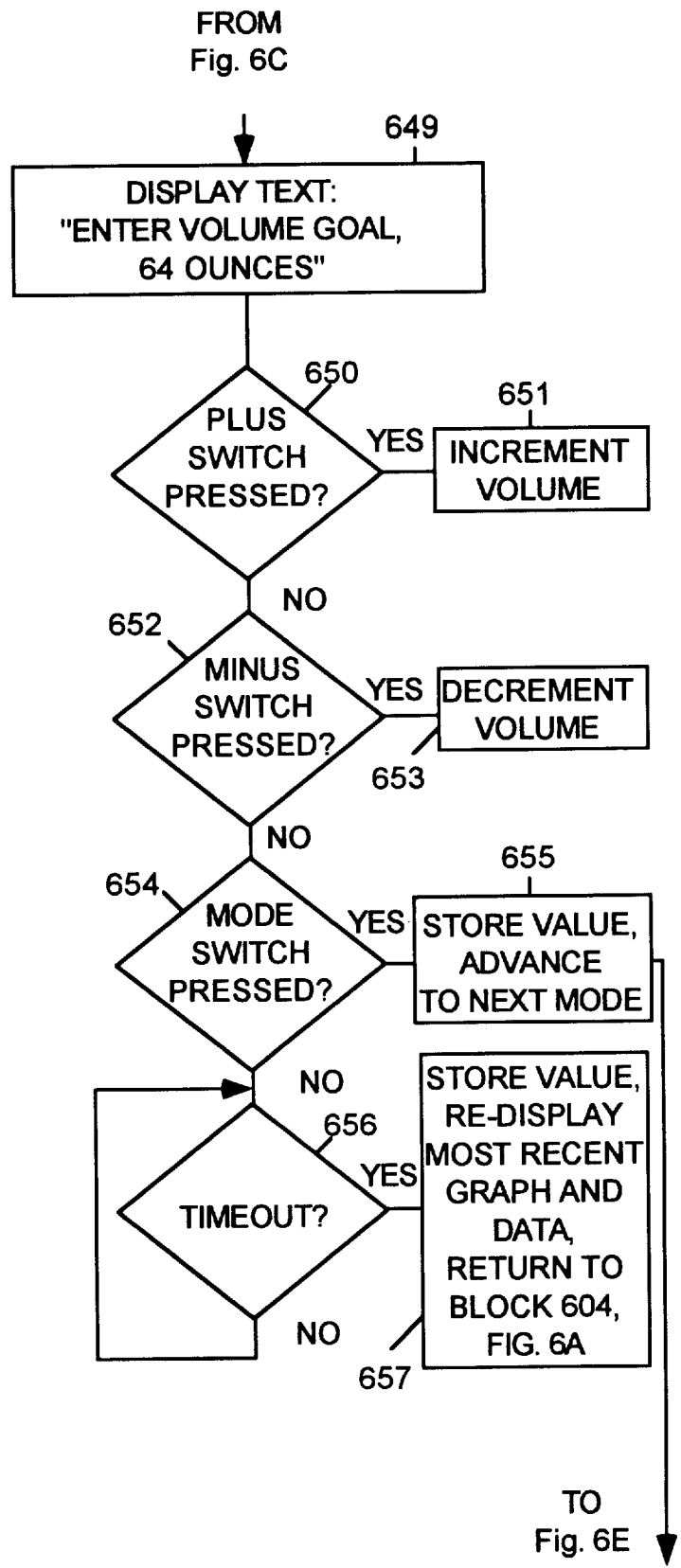
Figure 6E:
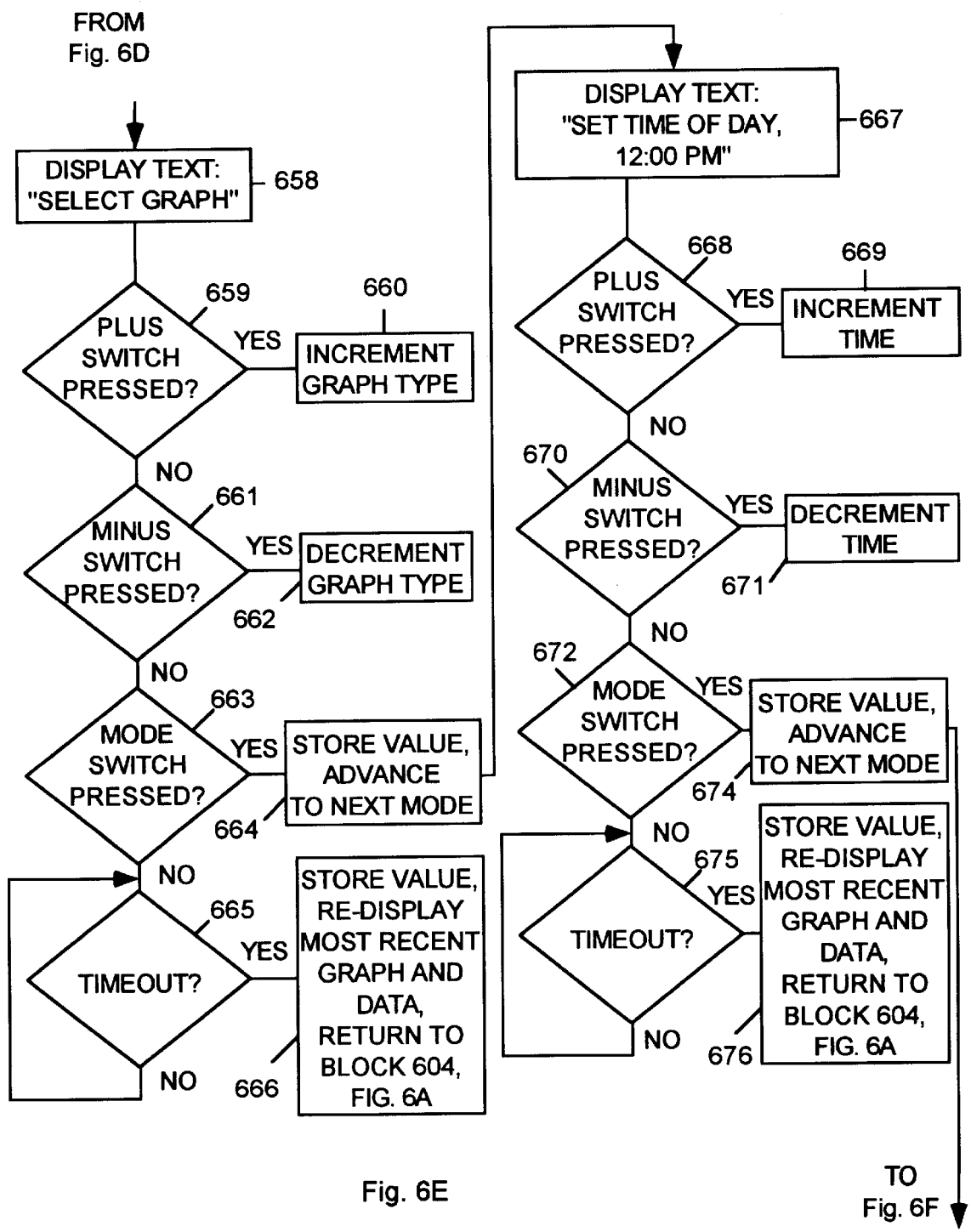
Figure 6F:
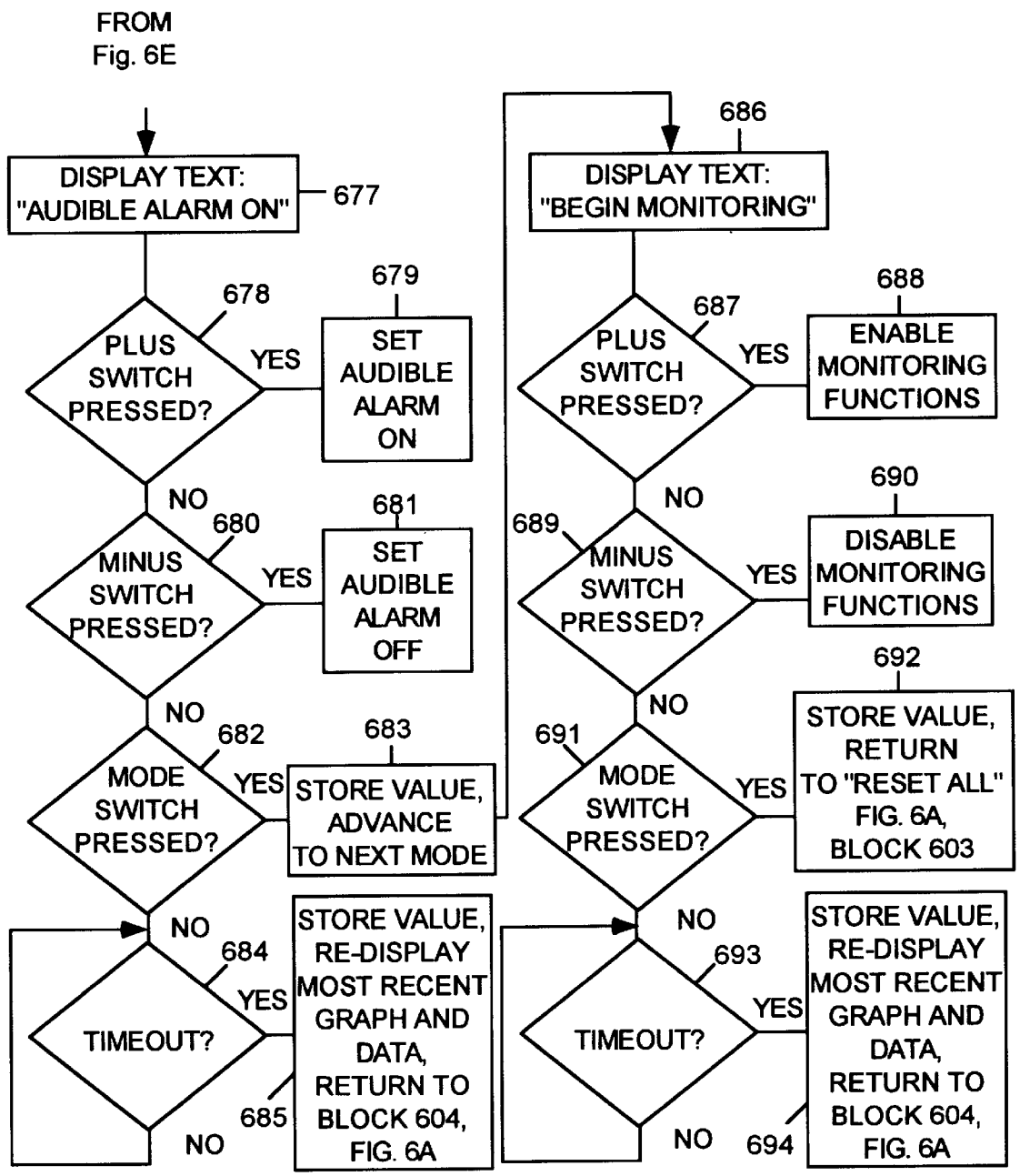
Figure 6G:
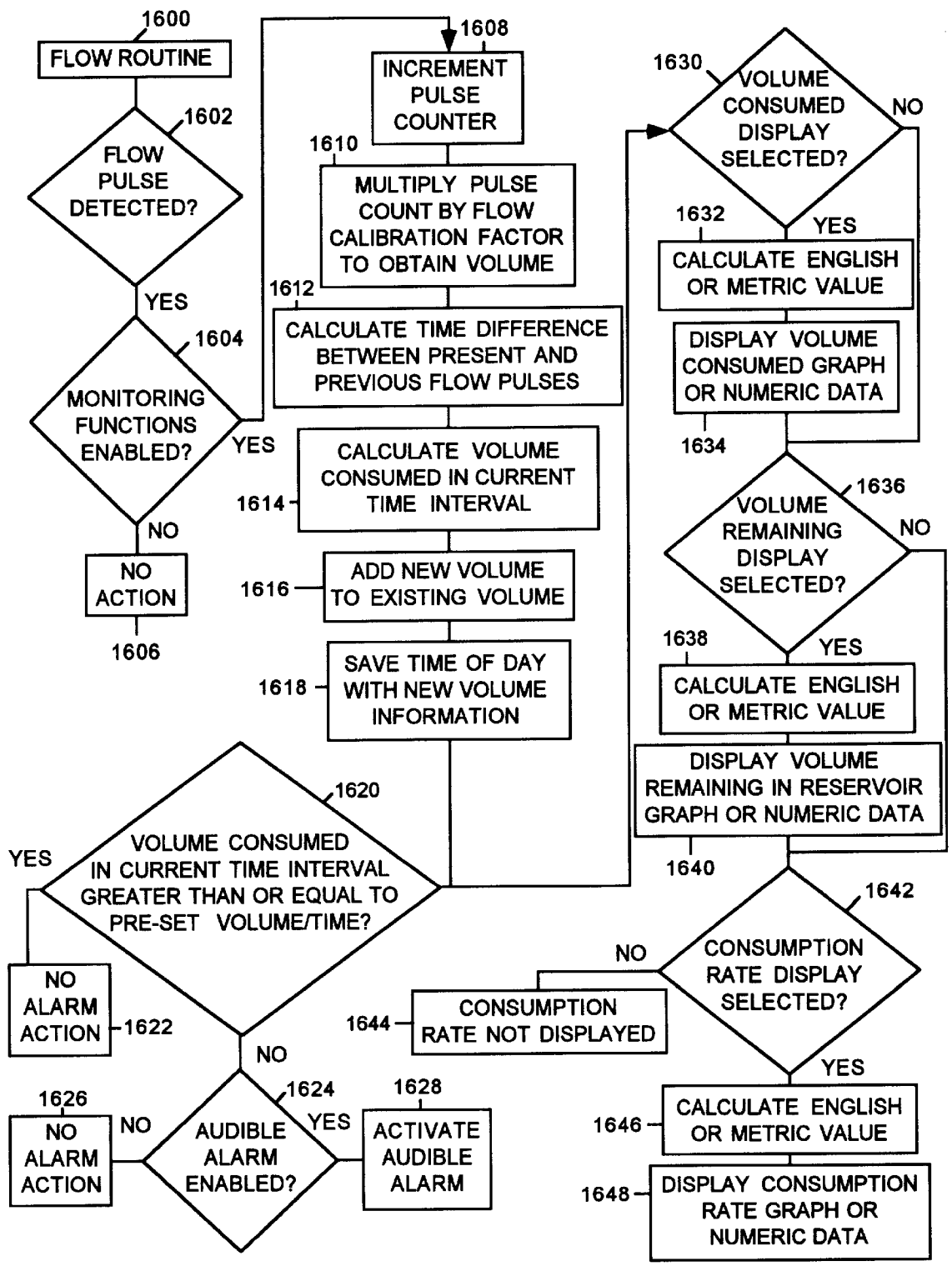

If a fluid flow pulse is detected (block 608), then the algorithm branches to the flow routines in FIG. 6G, block 609.

FIGS. 6B through 6F—Switch Routines

The switch routines begin at block 610. If plus switch 530 or minus switch 540 is pressed at this point in the program, this closure is ignored since its purpose is indeterminate.

Reset All—FIG. 6B

If either plus switch 530 or minus switch 540 is pressed at this point in the program the desired action would be unknown; therefore no action is taken (block 612).

If mode switch 550 is pressed (block 611), then display 292 (FIG. 2) shows the text: "Reset All?", block 613. At this point, the user can accept or reject this command. If the user presses plus switch 530, then program control returns to block 603 (FIG. 6A), resetting all functions, except the time of day, and setting the mode pointer to the reset function.

If the user presses minus switch 540 (block 616), indicating a negative response, no action is taken (block 617) and program control continues to block 618.

If mode switch 550 is pressed a second time (block 618), then program control advances to the next mode of operation (block 619).

If no switch is pressed, then a timeout function (block 620) is initiated. The program waits a predetermined amount of time, typically 5 seconds. Then display 292 redisplays the most recent data and program control returns to block 604 (FIG. 6A), and waits for another interrupt.

Select Units—FIG. 6B

Display 292 now shows the text "Select Units" (block 622). If plus switch 530 is pressed (block 623), all volumetric units subsequently shown on display 292 will be displayed as English units, i.e., ounces and quarts (block 624). English units will be shown in all data shown in display 292 (block 624) until another selection is made. Upon receiving the command "Reset All" (block 603), English units are the default choice. Alternatively, the default choice can be metric.

If minus switch 540 is pressed instead (block 625), then metric units, i.e. milliliters and liters, will be displayed (block 626).

If mode switch 550 is pressed (block 627), then in block 628 the program saves a parameter in the memory of microprocessor 300 which represents the current English or metric selection and advances to the next function, "Enter Reservoir Volume".

If no switch is pressed, then the timeout function (block 629) is initiated and in block 630, program control saves the current selection and returns to block 604, as above.

Enter Reservoir Volume—FIG. 6C

Display 292 now shows the text "Enter Reservoir Volume, 60 ounces", assuming English units are selected (block 631). Alternatively, the word "Enter" or "Enter Reservoir Volume" can be omitted and display 292 can read "Res. Vol.: 60 oz" or "VB 60 oz" or just "60 oz". If metric units were selected the display would instead show "Enter Reservoir Volume, 1.77 liters". The foregoing volumes contained in the program of microprocessor 300 are default values. Default values assist the user in setting the actual volume contained in the fluid reservoir 258 (FIG. 2). Due to the small size of the display, suitable abbreviations can be used for the foregoing and all other messages.

If plus switch 530 is pressed (block 632), the volume of fluid in reservoir 258 is incremented (block 633) by a convenient amount, preferably one ounce for each pressing of switch 530. After the first pressing of switch 530, the text on display 292 reads: "Enter Reservoir Volume, 61 ounces". After the second pressing, the text on display 292 reads: "Enter Reservoir Volume, 62 ounces", and so forth.

If minus switch 540 is pressed (block 634), then the volume of fluid in reservoir 258 is decremented (block 635) and display 292 is updated accordingly.

If instead mode switch 550 is pressed again (block 636), then the current reservoir volume value is stored in the memory of microprocessor 300 and program control advances to the next successive mode selection (block 637).

If no switch is pressed, the timeout function (block 638) stores the current reservoir volume value in the memory of microprocessor 300 and returns program control to block 604, as above (block 639).

Enter Consumption Rate Goal—FIG. 6C

Display 292 now shows the text "Enter Consumption Rate Goal, 8 Ounces/Hour", assuming, as above, that English units are selected (block 640). The goal of 8 ounces per hour is stored in the program of microprocessor 300 as a default value. If plus switch 530 is pressed (block 641), then the volume rate is incremented (block 642) by a convenient amount, preferably one-half ounce for each pressing of switch 530. After the first pressing of switch 530, the text on display 292 reads: "Enter Consumption Rate Goal, 8.5 Ounces/Hour". After the second pressing of switch 530, the text on display 292 reads: "Enter Consumption Rate Goal, 9.0 Ounces/Hour", and so forth.

If minus switch 540 is pressed (block 643), then the consumption rate goal is decremented (block 644) and display 292 is updated accordingly.

If instead mode switch 550 is pressed again (block 645), then the current consumption rate value is saved in the memory of microprocessor 300 and program control advances to the next successive mode selection (block 646).

If no switch is pressed, the timeout function (block 647) saves the current consumption rate value in the memory of microprocessor 300 and returns program control to block 604, as above (block 648).

Enter Volume Goal—FIG. 6D

Display 292 now displays the text: "Enter Volume Goal, 64 Ounces" (block 649), again assuming that English units are selected. The volume goal of 64 ounces is stored in the program of microprocessor 300 as a default value. If plus switch 530 is pressed (block 650), then the volume goal is incremented (block 651) by a convenient amount, such as one ounce for each pressing of switch 530. After the first pressing of switch 530, the text on display 292 reads: "Enter Volume Goal, 65 Ounces", the second pressing causes the display to indicate 66 ounces, and so forth.

If minus switch 540 is pressed (block 652), then the volume goal is decremented (block 653) and display 292 is updated accordingly.

If instead mode switch 550 is pressed again (block 654), then the current volume goal value is stored in the memory of microprocessor 300 and program control advances to the next successive mode selection (block 655).

If no switch is pressed, the timeout function (block 656) saves the current volume goal value in the memory of microprocessor 300 and returns program control to block 604, as above (block 657).

Select Graph—FIG. 6E

Display 292 now displays the text: "Select Graph" (block 658). Multiple actuations of plus switch 530 (block 659) cause the program to successively display volume consumed as a function of time, volume remaining in reservoir 258 as a function of time, a bar or pie chart showing total volume consumed, a bar or pie chart showing total volume remaining in reservoir 258, and the like (block 660).

Multiple actuations of minus switch 540 (block 661) cause the program to successively display graph types in reverse order (block 662). Thus if the user inadvertently presses switch 530 too many times, he or she can return to a previously displayed graph type by pressing switch 540.

If mode switch 550 is pressed (block 663), then the current graph type is saved in the memory of microprocessor 300 and program control proceeds to the next mode selection (block 664).

If no switch is pressed, the timeout function (block 665) saves the current graph type in the memory of microprocessor control and returns program control (block 666) to block 604 (FIG. 6A), as above.

Set Time of Day—FIG. 6E

Display 292 now displays the text: "Set Time of Day, 12:00 PM" (block 667). If plus switch 530 is pressed (block 668), the time shown on display 292 is incremented from the presently stored value and the internal time-of-day clock in microprocessor 300 is set to the new value (block 669). As above, the default value 12:00 PM is presented to the user after a system reset, such as would occur when a battery is replaced or master reset switch 551 (FIG. 5) is momentarily closed.

If minus switch 540 is pressed (block 670), then the time of day is decremented on display 292 and in the clock of microprocessor 300 (block 671).

If mode switch 550 is pressed (block 672), program control proceeds to the next mode selection (block 674).

If no switch is pressed, the timeout function (block 675) returns program control (block 676) to block 604, as above.
Audible Alarm—FIG. 6F

Display 292 (FIG. 2) now displays the text: "Audible Alarm On" (block 677). If Plus switch 530 is pressed (block 678), the audible alarm function which sounds through loudspeaker 520 (FIG. 5) is enabled (block 679).

If minus switch 540 is pressed (block 680), then the audible alarm function is disabled (block 681).

If mode switch 550 is pressed (block 682), then the state of the audible alarm function is saved in the memory of microprocessor 300 and program control proceeds to the next mode selection (block 683).

If no switch is pressed, then the timeout function (block 684) saves the state of the audible alarm function in the memory of microprocessor 300 and returns program control (block 685) to block 604, as above.
Begin Monitoring—FIG. 6F

Display 292 now displays the text: "Begin Monitoring" (block 686). If plus switch 530 is pressed (block 687), then the monitoring functions which have been established above, are enabled (block 688) and revolutions of impeller assembly 400 will be counted and fluid consumption monitored, as described below.

If minus switch 540 is pressed (block 689), then the monitoring functions are disabled (block 690).

If mode switch 550 is pressed (block 691), then program control proceeds to the next mode selection (block 692). In the absence of further selectable modes, the next mode selection is "Reset All" (block 613).

If no switch is pressed, then the timeout function (block 693) returns program control (block 694) to block 604 (FIG. 6A), as above.
FIG. 6G—Flow Routines When a flow pulse interrupt is detected by coil 510 and microprocessor 300 (FIG. 5), program control is directed (block 609—FIG. 6A) to the flow routine (block 1600). Upon detection of a flow pulse (block 1602), the flow routine interrupt handler tests to see if monitoring functions have been enabled (block 1604). If not, no action is taken (block 1606) and microprocessor 300 waits for another interrupt (block 604).

If monitoring functions are enabled (block 1604), then the program memory location in microprocessor 300 which counts flow pulses is incremented (block 1608). The newly-incremented value is multiplied (block 1610) by a flow calibration factor which is stored in the memory of microprocessor 300. The flow calibration factor is determined at the time of manufacture of flow transducer 250 (FIG. 3).

The time interval since the most recent flow pulse and the present flow pulse is determined (block 1612). The new increase in volume determined above in block 1610 is divided by the current time interval to yield the volume consumed in this time interval (block 1614).

The new volume is added to the existing volume in the memory of microprocessor 300 (block 1616), along with the time of day (block 1618).

In block 1620, the volume consumed in the current time interval is compared with the consumption rate set by the user (block 640—FIG. 6C). If this rate is greater than or equal to the pre-set rate (volume/time), then no alarm action is taken (block 1622).

If, however, the rate of consumption is less than the pre-set rate (block 1620) and the audible alarm function is enabled (block 1624), then an audible alarm is activated (block 1628). If the audible alarm function is disabled, then no alarm action is taken (block 1626).

If the volume consumed display is selected (block 1630), then the volume consumed is calculated in either English or metric units (block 1632) and displayed on display 292 in either graphical or numeric form (block 1634).

If the volume remaining display is selected (block 1636), then the volume remaining is calculated by subtracting the volume consumed (block 1632) from the reservoir volume (blocks 633 and 635—FIG. 6C). The English or metric equivalent of this value is then calculated (block 1638) and displayed in either graphical or numeric form (block 1640).

If the consumption rate display is selected (block 1642), then the rate of consumption is calculated in either English or metric units (block 1646) and displayed in either graphical or numeric form (block 1648).

If the consumption rate display is not selected, then it is not displayed (block 1644).

The calculated volume and flow rates (blocks 1634 and 1648) are presented on display 292. For example, one indication on display 292 reads: "1.5 liters, 0.25 liter/hr". A typical volume remaining display (block 1640) reads "23 ounces".
Summary of Modes of Operation The following is a summary of the above modes of operation and can serve as an instruction label for the system.

To reset all functions, press reset switch 551 momentarily.

To reset the meter, except time of day, press mode switch 550 once, then press plus switch 530 once.

To select English or metric units, press mode switch 550 twice, then press plus switch 530 to select English, or minus switch 540 to select metric.

To enter reservoir volume, press mode switch 550 again, then press plus switch 530 or minus switch 540 to select the desired value.

To enter the consumption rate goal, press mode switch 550 again, then press plus switch 530 or minus switch 540 to select the desired consumption rate goal value.

To enter the volume goal, press mode switch 550 again, then press plus switch 530 or minus switch 540 to select the desired volume goal value.

To select the graph type, press mode switch 550 again, then press plus switch 530 or minus switch 540 until the desired graph type is displayed.

To set the time of day, press mode switch 550 again, then press plus switch 530 to increment the time, or minus switch 540 to decrement the time.

To enable the audible alarm, press mode switch 550 again, then press plus switch 530 to enable the audible alarm feature, or minus switch 540 to disable it.

To begin monitoring, press mode switch 550 again, then press plus switch 550.

To accept the current value of any selected feature, press mode switch 550 again, or simply wait for the timeout function to return execution to the start of the program.
Drinking Straw Application—FIG. 7

Various arrangements of the flow meter and display system can be used. In the embodiment of FIG. 7, the flow meter and electronics 250 and 290 (FIG. 2) are incorporated in a drinking straw 710. Display 292 additionally contains a graph 730 which displays the total volume of fluid, V, consumed as a function of time, t. Optional filter 740 is shown at the entrance of straw 710. An optional clip 750 attaches the flow meter and straw combination to the side of a glass or other container, providing mechanical stability. Straw 710 is typically made of a disposable, semi-rigid plastic, such as polyethylene, or a composite paper material. Straw 710 is supplied in two pieces which slide over the ends of tubing pieces 240 and 270 (FIG. 2), forming a leak-proof coupling. Straw pieces 240 and 270 are later removed and discarded, and flow meter and electronics 250 and 290 are sterilized for re-use. Alternatively the straw sections can be made of a "permanent" material, such as plastic and "permanently" attached to the meter.

In use, all the fluids consumed throughout a given time period pass through the straw-and-flow meter assembly. Thus the user can re-fill the same container, or move the straw from a glass to a bottle, and to any other vessel throughout the time period, providing a cumulative indication of the volume and rate of consumption of fluids.

Drinking Bottle Application—FIGS. 8A and 8B

FIG. 8A shows a side view and FIG. 8B shows a top view of a drinking bottle 800 with an integral or included flow meter and indicator display 290. The meter and display assembly is located on the top lid 810 on bottle 800, near cap 820. Display and control unit 290 is held in contact with assembly 250 and lid 810 by clips 815. Alternatively the bottle sections can be made of a "permanent" material, such as plastic and "permanently" attached to the meter. Optional filter 860 is shown at the bottom of tube 830. Display 292 incorporates a bar-graph 850 to indicate fluid consumption or other variables as a function of time or other events.

The user opens cap 820 and provides oral suction to withdraw fluid 255 from bottle 800. Tube 830 is optional. If it is not present, the user must tip bottle 800 to cause liquid 255 to reach the top, inner surface of lid 800. The user then provides oral suction through open cap 820 in order to withdraw liquid 255 from bottle 800.

Bottle 800 can be re-filled at any time with any drinkable liquid 255. The volume and rate of consumption of fluid 255 are reported by the flow meter assembly.

Backpack, Waist-Pack Or Other Fluid Reservoir—FIG. 9

FIG. 9 shows a meter-display assembly in combination with a backpack or waist-pack fluid reservoir. Flow meter 202 is inserted in tubing 270 attached to backpack or waist-pack fluid reservoir 900. Using suction 200, the user withdraws liquid from reservoir 900. Meter and display 202 show the volume and rate of fluid consumption. To obtain fluid, the user applies oral suction to tubing 270, drawing the fluid out of reservoir 900. Reservoir 900 can be re-filled at any time with any drinkable liquid. Again, the volume consumed and rate of consumption, as well as the alarm functions, are reported by flow meter 202. A clip, similar to clip 702 (FIG. 7), can be used to hold meter 202 on the user's lapel or shoulder strap or other convenient location for easy viewing.

Separable Embodiment—FIGS. 10 and 11

FIGS. 10 and 11 show a separable version in which the electronics display unit 290 (FIG. 2) is detachable from the impeller section 250. This concept is shown schematically in FIG. 2. Normally the two sections are held together by clips 815, or similar devices. The ability to detach the two sections permits sterilization or replacement of one or both sections. For example, the impeller section may be a disposable, pre-packaged, sterile unit while the electronics section is sterilized or replaced between uses, if necessary. Detachment also permits prior installation of the impeller section within a sealed environment.

In this embodiment, flow progresses from left to right. Fluid enters connector 816, passes through impeller section 250, and exits through connector 817. Reverse flow is prevented by optional check valve 280.

Connector 816 is inserted into lower tube 270 (FIGS. 2 and 9), the lower end of straw 710 (FIG. 7), or tube 830 (FIG. 8). Connector 817 is inserted into one end of tube 220 (FIGS. 2 and 9), the upper half of straw 710 (FIG. 7), or cap 820 (FIG. 8). Connector 817 can also be replaced with a smooth pipe section which would contact the user's lips for direct ingestion of fluid 255 (FIG. 2).

Typical Graphical Displays—FIGS. 12A through 12D

Figure 12A:
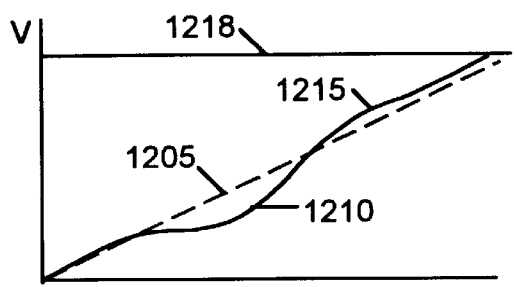
FIGS. 12A through 12D are four graphical presentations according to the present invention.

Volume Consumed as a Function of Time—Consumption Rate Goal—FIG. 12A

FIG. 12A shows a graph of desired and actual volume, V, of fluid over time, T. Dashed line 1205 shows the desired and pre-set rate of consumption, or consumption rate goal. Region 1210 of the graph which lies below line 1205 indicates lower-than-desired consumption of fluids for a period of time. When this occurs, an audible alarm will sound if that function is enabled. When consumption lies above line 1205, more fluids are consumed than required, and no alarm will sound.

Solid line 1218 represents the total volume goal, i.e. the total volume which is to be consumed during the present time period.

The graphical formats (well-known program objects) are stored within the memory (not shown) of microprocessor 300. When a graph type is selected, microprocessor 300 causes a graph of that type (e.g., bar graph, line graph, pie chart) to be displayed on display 292. As data are available, they are added to the graphical presentation.

Figure 12B:
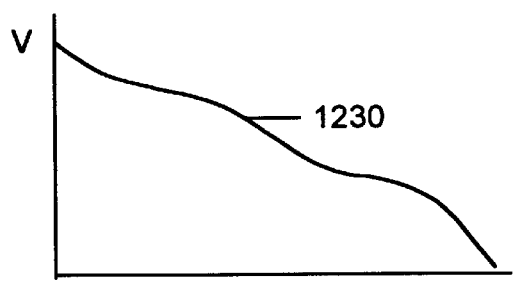

Volume Remaining as a Function of Time—FIG. 12B

FIG. 12B shows a graph 1230 of the volume, V, remaining in reservoir 258 (FIG. 2) as a function of time, T. This remaining indication is useful and is selected when the user desires to know (without visual inspection of the reservoir) how much fluid is left and how their consumption rate has progressed.

Figure 12C:
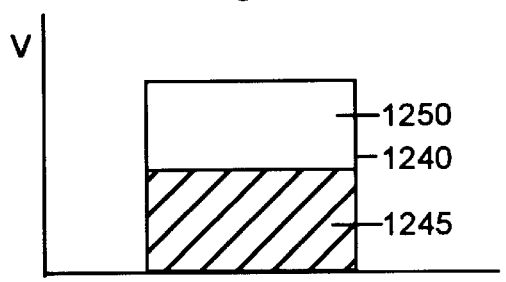

Volume to be Consumed—FIG. 12C

FIG. 12C shows a bar chart 1240 of volume to be consumed, or total volume goal. Shaded portion 1245 indicates fluid remaining. Clear portion 1250 indicates fluid consumed. The same quantity is indicated at 1218 in FIG. 12A. This is useful when the user desires a graphic, shaded/unshaded representation of the fluid consumed and remaining.

Figure 12D:
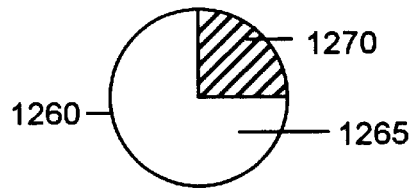

Volume Remaining—FIG. 12D

FIG. 12D shows a pie chart 1260. The volume of fluid remaining in the reservoir is indicated by clear area 1265. The volume of fluid consumed is indicated by shaded area 1270. This chart has the same utility as the bar chart FIG. 12C, but uses the pie format which is preferred by some users.

Typical Usage of the Preferred Embodiment

To illustrate the operation and substantial advantages of the present flow meter, I will describe a typical usage. Assume that a user plans a day hike and using the backpack-style hydration system of FIG. 9. The user fills reservoir 900, dons the backpack, and then prepares the system as follows. All actions on the system of the preferred embodiment are accomplished by pressing mode switch 550 (FIG. 3), and plus and minus switches 530 and 540, respectively.

First, the hiker resets the system to clear all graphs and counters by pressing mode switch 550 once, causing "Reset All?" to appear in display 292, then pressing plus switch 530 once to accept the reset command. Next, the hiker fills backpack reservoir 900 (FIG. 9) to full capacity. Assume that reservoir 900 holds 2 liters (68 ounces). Then he or she enters the volume of the reservoir by pressing mode switch 550 until display 292 reads: "Enter Reservoir Volume, 60 Ounces". The user then presses plus switch 530 eight times until display 292 reads: "Enter Reservoir Volume, 68 Ounces". The user can then press mode switch 550 again to enter the next mode of operation and cause the current reservoir volume value to be stored in the memory (not shown) of microprocessor 300. Or the user can simply wait for the timeout function to re-display the most recent graph and data, at which time the volume of reservoir 900 is automatically stored in the memory of microprocessor 300.

Next, the hiker sets the system to issue an audible reminder, through loudspeaker 520, to drink fluid or check consumption level at predetermined intervals. Mode switch 550 is pressed until display 292 reads: "Audible Alarm ON". The user then presses plus switch 530, thus enabling of the audible alarm function. Desired consumption rates and levels are then entered into the memory of microprocessor 300. This is done by pressing mode switch 550 until "Enter Consumption Rate Goal, 8 Ounces/Hour" appears on display 292. Plus switch 530 and minus switch 540 are used to increment and decrement the displayed consumption rate goal. The user then either presses mode switch 550 to save the data and proceed to the next mode of operation, or simply waits for a timeout which will save the data and return program control to block 604, FIG. 6A. After the consumption rate goal has been entered, another pressing of mode switch 550 causes display 292 to read: "Enter Volume Goal, 64 Ounces". Plus switch 530 and minus switch 540 are used to increment and decrement the displayed volume goal. When the desired value is reached, the user either presses mode switch 550 to move to the next mode of operation, or waits for the timeout function to return program control to block 604, FIG. 6A.

At the start of the hike, the hiker activates the hydration system by pressing mode switch 550 until display 292 reads "Begin Monitoring". Then the hiker presses plus switch 530 to enable the monitoring functions. Liquid consumption is monitored by microprocessor 300. If the user hydrates at the proper rate, no alarm will be issued by speaker 520. If, however, the user lags behind the proper, preset rate of hydration (see section 1210 in FIG. 12A), speaker 520 will sound, reminding the user to take a drink.

A further alarm is provided when reservoir 900 reaches a predetermined, low level, (e.g., 0.5 liter). This alerts the user to refill the reservoir.

Throughout the day, the user can monitor hydration progress on display 292. Progress preferably is indicated with line graph 730 (FIG. 7), or alternatively by bar graph 850 (FIG. 8B). Or it can be simply indicated by numbers, such as shown in FIG. 2. All options are selectable using mode switch 550, and plus and minus switches 530 and 540, respectively, as described above.

Thus the user will be reminded and hence will be properly hydrated throughout the day, thereby avoiding dehydration. At the end of the hike, the user will easily be able to see the level of hydration that he or she attained. The graph values remain on display 292 until the system is reset in preparation for monitoring another event.

In addition to use by a hiker, the system can be used by athletes in various sports, office or factory workers, travelers, people at leisure, sick persons, or anyone desiring proper hydration.

Summary, Ramifications, and Scope

It is thus seen that the present system combines a method for withdrawing fluid from a reservoir by orally-applied suction, and measurement of the volume and rate of withdrawal of the fluid. Any fluid can be used, including water, electrolyte-replacement liquids, refreshing liquids, and the like. The rate of consumption of fluid is accurately reported. If the rate is too low, the system will sound an alarm to alert the user to drink more for proper hydration. The period over which the fluid is consumed and the amount of fluid are retained in the memory of the system and reported on the system's display.

As stated, the present system can be used by all individuals, not just athletes. The present system is suitable for monitoring and insuring that anyone has a proper and adequate water or fluid intake. It can also be used for non-human animals by a pet owner, veterinarian, zookeeper, or the like to ensure proper hydration of any animal. Also, the automatic reminder feature can be used to remind a trained animal to drink if necessary.

Although the above description contains many specificities, these should not be construed as limiting the scope of the invention, but merely as providing illustrations of some of the presently preferred embodiments. Many variations and ramifications are possible.

An "auto-scan" function can be added which automatically displays each mode of operation for a period of time. This function can be started and stopped by pressing one or another of the buttons on the unit.

The monitoring period can be extended from a single event or day to more events and longer times. With additional programming, different rates of hydration can be entered for requirements at differing rates of exertion over predetermined time intervals. Conversely, the monitoring period can be reduced to encompass hydration over only part of an event.

Instead of measuring consumption rate in terms of volume consumed per hour, another time period can be used, such as volume consumed per 15 minutes or volume consumed per two hours.

In a children's version, the graphical display can incorporate simple, pictorial representations of fluid consumption.

A 12 or 24-hour hour time display can be used.

The audible alarm can be set to check consumption and alert the user at predetermined intervals such as 15, 30, 45, or 60 minutes.

Other computational capabilities can be included in the microprocessor's algorithms. For example, the user enters her or his weight and the contemplated duration of exercise. The unit then calculates and displays the optimal quantity of fluid which should be consumed during this period.

A communications link can be provided to an external computer, permitting downloading or uploading of information and data.

The unit is typically waterproof, shockproof, and vibration-resistant.

A key-chain and clip or loop can be attached to the unit.

The unit can be subdivided into two separately operating sections. The first section is used to measure flow, and the second section is used to indicate flow and other computationally-derived information. A communications link can be provided between the two halves. Thus an embodiment can be made to transmit data from a reservoir to a remotely-located display.

An altimeter function can be included to provide added information for input to the algorithms used to calculate fluid requirements.

While the preferred embodiment is an electromechanical assembly with a Liquid Crystal Display (LCD) readout, the system can comprise an entirely mechanical system. This system can comprise a magnetic link to an impeller assembly and a readout with one or more hands, similar to a watch, which is geared to move proportionally with the volume of fluid consumed.

The LCD readout can be back-lit for use in low-light environments. Alternatively, a light-emitting-diode (LED) readout can be used.

Instead of displaying one graph and a set of numbers at a time, multiple graphs and multiple rows of numbers can be displayed.

While the drawing figure of the preferred embodiment indicates a battery power source, other sources can be used. These include solar photo-voltaic cells, fuel cells, external power supplies, and the like.

An automatic "sleep", or shut-down, function can be incorporated. When the unit is not used for an extended period of time, the microprocessor can enter a low-power, sleep state. It can be re-awakened by signals resulting from impeller assembly rotation which indicate fluid flow.

An additional graphical indication showing battery reserve can be included.

With the addition of a temperature sensor, the system can adjust the user's consumption according to the demands of temperature in a particular environment. A low-battery condition can also cause an alarm. Alarms caused by low reservoir and drink reminder can be enabled separately.

The system's display can present data in either English or metric format. More or fewer buttons can be provided according to the requirements of a particular design. The system can be mounted on the user's body, in a straw, in a piece of tubing, in or on a bottle, and so forth.

The system can be separated into its flow sensor and electronic components. This facilitates sterilization or replacement of all parts. It also facilitates mounting of the two halves of the system in their respective locations. The two halves are then held in proximity by a clamp or clip or other means.

Instead of being separable, the two components can be rigidly attached within a rugged case.

The components of the system can be made of freeze-resistant materials to prevent freezing at low temperatures.

Thermal insulation can be incorporated with the fluid reservoir and delivery tube to provide additional protection against ambient temperature extremes.

A purification device can be incorporated into the system to remove undesirable impurities which may be harmful or bad-tasting to the user.

The clock can include month, day, year, and day of week displays. Multiple colors, textures, words, and symbols can be used in the display.

The display can include a cumulative fluid counter, similar to an odometer used in vehicles.

A reverse-flow counter can be used to measure the volume of fluid flowing from the user end of the system into the reservoir. This enables filling of the reservoir from the user end of the system. The volume added to the reservoir in this way is automatically added to the reservoir volume in the microprocessor's memory.

A start-stop function can be employed to permit pausing the data-taking process.

A stop-watch function can be included.

User preset profile preferences can be employed to customize various mode settings to a particular user. Once customized, the user would not have to re-enter a particular value. Also, profiles can be saved for different users. When a previous user identifies herself or himself to the system, that person's settings are automatically entered into each preset value.

In the case of a drinking straw unit, the flow sensor can be integrated with the upper and lower sections of the straw in one unit.

Different shapes, sizes, and colors of the individual components can be used to meet various requirements. Other impeller assembly designs can be used. More or fewer vanes, different angles, and different numbers of magnets can be used. The vanes can be larger or smaller, longer or shorter than shown above. Instead of a simple impeller assembly, a gear- or vane-type rotary metering devices can be used. Instead of magnetic detection, other rotation-detection means can be used. Instead of a coil, a Hall-effect device, well known to those skilled in electronics, can be used.

Instead of incrementing or decrementing with each pressing of the mode, plus, or minus switches, an automatic increment/decrement feature can be used. With this feature, simply pressing and holding a switch causes the current selection to increase or decrease.

With proper calibration, viscous, non-viscous, Newtonian, and thixotropic fluids can be accommodated, in addition to water and soft drinks.

In the case of a bottle reservoir, the user can manually squeeze the bottle while applying oral suction. The bottle can have a different style closure such as a flip-top spout or cap. The bottle can also have a loop-top to prevent lost lids. The bottle can also have a hydroporous vent, which permits air to enter the bottle for easy drinking, but won't allow water to leak when the bottle is tipped. Additionally, a straw cap can be grommeted to prevent leakage around the straw. Side measurement markings in English or metric units or both on the bottle can show the volume of fluid remaining. The bottle can be made of polycarbonate material, making it virtually indestructible, or a non-leaching, high-density polyethylene plastic which will not impart a taste to the fluid.

Accordingly the scope of this invention should be determined, not by the embodiments illustrated, but by the appended claims and their legal equivalents.

I claim:

1. A method of enabling the monitoring and controlling of either an individual's or an animal's proper hydration, comprising:

providing a liquid consumption meter for indicating the cumulative quantity of liquid passing through said meter, said meter having proximal and distal open ends for discharging and receiving liquid, respectively, communicating said proximal open end with a user and said distal open end with a liquid in a liquid reservoir carried with said user, imbibing a quantity of said liquid at arbitrary times within a predetermined time period by said user from said proximal end of said consumption meter from said reservoir through said consumption meter so that said consumption meter indicates a cumulative value of said quantities of liquid consumed by said user, and monitoring said cumulative value of said liquid over said predetermined time period by said user so that proper hydration is insured.

2. The method of claim 1 wherein said consumption meter is integral with said reservoir.

3. The method of claim 1 wherein said consumption meter has a digital readout.

4. The method of claim 1, further including a tube connecting said distal end of said consumption meter to said reservoir.

5. The method of claim 1 wherein said proximal end of said consumption meter comprises a suction tube.

6. The method of claim 1, further including a tube for connecting said distal end of said consumption meter to said reservoir, and wherein said proximal end of said consumption meter comprises a suction tube.

7. The method of claim 1 wherein said consumption meter further provides a sensible indication when the quantity of liquid imbibed by said user within a predetermined time interval fails to reach a predetermined value, whereby a user will be reminded to consume an adequate quantity of liquid.

8. The device of claim 7 wherein said sensible indication is an audible alarm, whereby said user will be audibly alerted when said user has not imbibed said predetermined value of said adequate quantity of liquid within said predetermined time interval.

9. A liquid-consumption device for enabling the monitoring and controlling of either an individual's or an animal's proper hydration comprising:
    a portable liquid reservoir for holding a quantity of liquid, said reservoir being carried by a user,
    a liquid consumption meter having a passage therethrough for indicating a quantity of liquid each time said liquid moves through said passage,
    said reservoir including means for transferring liquid from said reservoir via said passage in said meter into said user, such that the cumulative quantity of liquid imbibed by said user from said reservoir being indicated by said meter to thereby insure proper hydration.

10. The device of claim 9 wherein said means comprises a tube for communicating said meter with said user.

11. The device of claim 9 wherein said means comprises a first tube for communicating said meter with said user and a second tube for connecting said reservoir to said meter.

12. The device of claim 9 wherein said consumption meter is integral with said reservoir.

13. The device of claim 9 wherein said consumption meter has a digital readout for indicating a quantity of liquid consumed.

14. The device of claim 9 wherein said consumption meter includes a plurality of vanes rotatably responsive to the flow of liquid therethrough, and means for counting the number of rotations of said vanes.

15. The device of claim 14 wherein said means for counting comprises a magnet arranged to move with said vanes and a coil positioned to generate pulses in response to rotation of said magnet.

16. The device of claim 9 wherein said consumption meter has a mechanical component responsive to the flow of liquid therethrough for providing an electrical output indicative of the amount of liquid flowing therethrough, and an electrical component responsive to said electrical output for indicating the quantity of liquid flow therethrough.

17. The device of claim 16 wherein said mechanical component and said electronic component are integral.

18. The device of claim 9 wherein said consumption meter provides a sensible indication when the quantity of liquid imbibed by said user within a predetermined time interval fails to reach a predetermined value, whereby a user will be reminded to consume an adequate quantity of liquid within said predetermined time interval.

19. The device of claim 18 wherein said sensible indication is an audible alarm, whereby said user will be audibly alerted when said user has not imbibed said adequate quantity of liquid.

* * * * *